US012595688B2

(12) United States Patent
Hall et al.

(10) Patent No.: US 12,595,688 B2
(45) Date of Patent: Apr. 7, 2026

(54) SECURE, REMOTELY CONTROLLED, INTERNALLY POWERED PADLOCK

(71) Applicant: Mobile Tech, Inc., Hillsboro, OR (US)

(72) Inventors: Jude Hall, Hillsboro, OR (US); Steven R. Payne, Hillsboro, OR (US); Robert Blaser, Hillsboro, OR (US); Jacob Collier, Hillsboro, OR (US)

(73) Assignee: Mobile Tech, Inc., Hillsboro, OR (US)

( * ) Notice: Subject to any disclaimer, the term of this patent is extended or adjusted under 35 U.S.C. 154(b) by 311 days.

(21) Appl. No.: 18/303,862

(22) Filed: Apr. 20, 2023

(65) Prior Publication Data

US 2024/0352772 A1 Oct. 24, 2024

(51) Int. Cl.

*E05B 67/38* (2006.01)
*E05B 47/00* (2006.01)
*E05B 67/24* (2006.01)

(52) U.S. Cl.

CPC .......... *E05B 67/38* (2013.01); *E05B 47/0012* (2013.01); *E05B 67/24* (2013.01); *E05B 2047/0071* (2013.01)

(58) Field of Classification Search

CPC .......... E05B 67/00; E05B 67/24; E05B 67/38; E05B 47/0012; E05B 2047/0071; E05B 67/18; G07C 9/00174; G07C 2009/00769; G07C 2009/00865; H03K 17/00; H03K 2017/515

USPC .............................................................. 70/20

See application file for complete search history.

(56) References Cited

U.S. PATENT DOCUMENTS

| | | | | |
|---|---|---|---|---|
| 9,728,022 B2 * | 8/2017 | Gengler | G07C 9/00174 | |
| 10,633,891 B2 * | 4/2020 | Sidhu | E05B 67/28 | |
| 2013/0271260 A1 * | 10/2013 | Tubb | E05B 39/00 | 70/20 |
| 2014/0250954 A1 * | 9/2014 | Buzhardt | G07C 9/00 | 70/20 |
| 2015/0225986 A1 * | 8/2015 | Goldman | E05B 17/002 | 70/20 |
| 2015/0292244 A1 * | 10/2015 | Beatty | E05B 47/0012 | 70/20 |
| 2019/0368233 A1 * | 12/2019 | Gengler | E05B 47/0611 | |

FOREIGN PATENT DOCUMENTS

WO WO-2012042515 A1 * 4/2012 ............. E05B 39/00

* cited by examiner

*Primary Examiner* — Suzanne L Barrett
(74) *Attorney, Agent, or Firm* — OPWII, LLC

(57) ABSTRACT

The current document is directed to an improved, remotely controlled, internally powered electronic padlock with enhanced security features that, when mechanically compromised, automatically generate alarms. The improved padlock can be opened via a key card placed in proximity to the improved padlock and can additionally be opened in response to receiving a command from a remote controller via network communications. A remote controller can configure the improved padlock, update the configuration of the improved padlock, unlock the improved padlock, and query the state of the improved padlock. A rotating switch, in combination with a translating latch plate and control logic implemented by stored microprocessor instructions and a microprocessor, detects various types of mechanical compromise and initiates generation of an audible alarm.

20 Claims, 27 Drawing Sheets

SECURE, REMOTELY CONTROLLED, INTERNALLY POWERED PADLOCK

TECHNICAL FIELD

The current document is directed to locks and security devices and, in particular, to a remotely controlled and internally powered padlock that generates an alarm when mechanically compromised.

BACKGROUND

Padlocks have been manufactured and used for thousands of years. Padlocks of many different shapes and sizes, with many different locking and unlocking mechanisms, have been manufactured and used. Commonly used padlocks include a lock body and a shackle. The shackle is generally a U-shaped, curved, cylindrical metal rod, with a short arm and a long arm. The long arm is rotationally and slidably coupled within the housing when the padlock is unlocked, while the short arm is fully outside the housing and can rotate about a rotation axis coincident with the long arm. When the shackle is pressed downward, the short arm enters the housing and both arms engage with an internal locking mechanism to lock the padlock while, at the same time, a spring associated with the long arm is compressed. When the padlock is unlocked, via a key or mechanical input of a combination, the locking mechanism disengages from the shackle arms and the spring decompresses, forcing the shackle upward and releasing the short arm from the housing. Padlocks are often used in combination with latches, cables, chains, and other such security devices to securely fix the position of an item, such as a bicycle or door.

With the advent of microprocessors, network communications, and other modern technologies, a new generation of padlocks that incorporate these modern technologies has been developed to provide enhanced security features. New-generation padlocks may be locked and unlocked by electrically powered motors and may be remotely controlled through various types of communications media, including network communications and other radio-frequency communications. These new-generation padlocks are being widely used in retail environments to secure displayed products and display cases. However, there are numerous problems and technical challenges associated with the use of new-generation padlocks in retail environments, including the need for power cables, remote control that is less efficient and effective than desired, and a lack of rapid detection of disabled and improperly functioning padlocks. For these reasons, designers, manufacturers, and users of new-generation padlocks continue to seek improvements and enhanced features to facilitate their use in retail environments and other environments.

SUMMARY

The current document is directed to an improved, remotely controlled, internally powered electronic padlock with enhanced security features that, when mechanically compromised, automatically generate alarms. The improved padlock can be opened via a key card placed in proximity to the improved padlock and can additionally be opened in response to receiving a command from a remote controller via network communications. A remote controller can configure the improved padlock, update the configuration of the improved padlock, unlock the improved padlock, and query the state of the improved padlock. A rotating switch, in combination with a translating latch plate and control logic implemented by stored microprocessor instructions and a microprocessor, detects various types of mechanical compromise and initiates generation of an alarm.

DETAILED DESCRIPTION

Figure 1B:
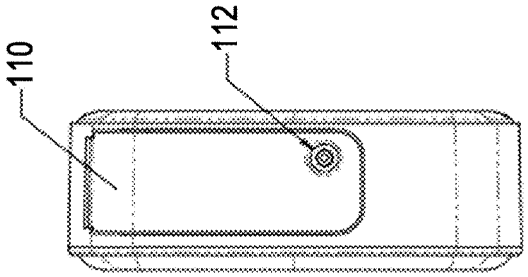
FIGS. 1A-D show external views of one implementation of the currently disclosed improved padlock.
Figure 1D:
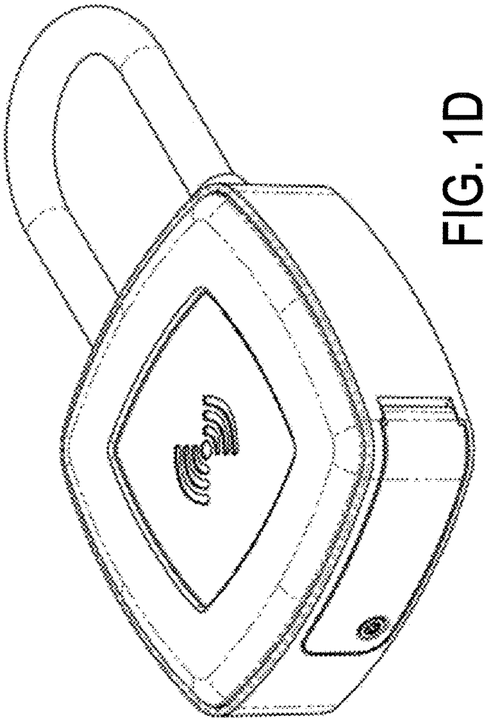
Figure 1A:
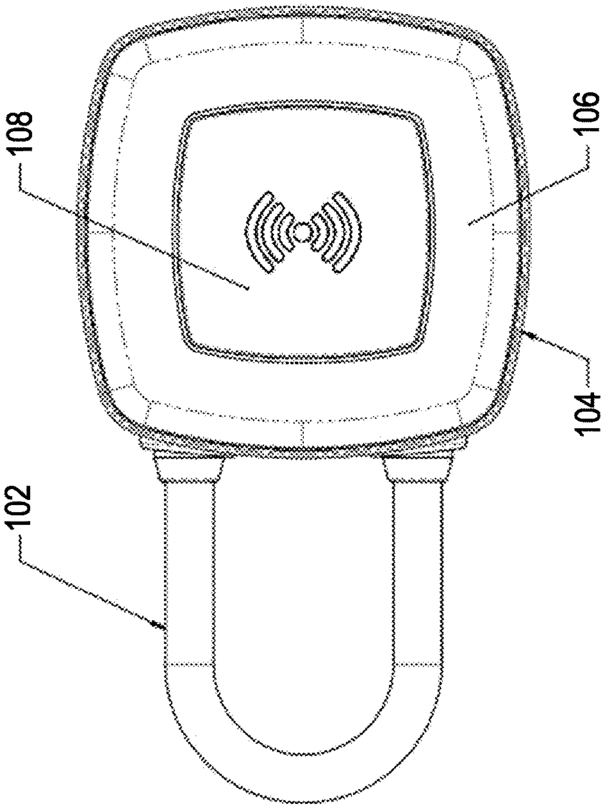
Figure 1C:
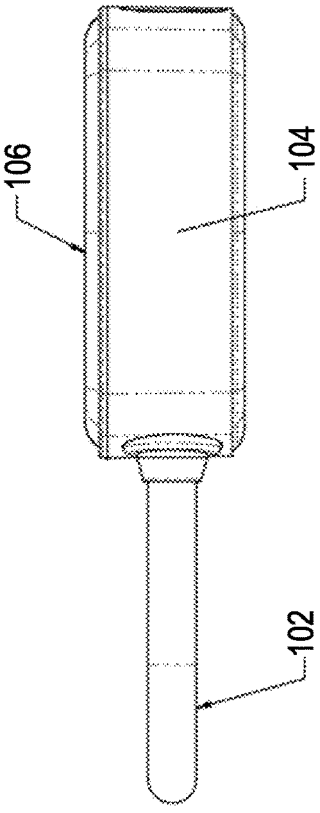

FIGS. 1A-D show external views of one implementation of the currently disclosed improved padlock. FIG. 1A shows a view of the improved padlock looking down on the top surface of the housing. The improved padlock includes a shackle 102, a die-cast housing 104, a die-cast cover 106, or faceplate, and a top cover 108 made from a radio-frequency-transparent material, such as plastic. FIG. 1B shows a view of the bottom surface of the improved padlock, which includes a battery door 110 and a battery-door security fastener 112. FIG. 1C shows an edge-on view of the improved padlock, including the shackle 102, die-cast cover 106, and a side of the die-cast housing 104. FIG. 1D shows a perspective view of the improved padlock. Various different materials can be used for the housing, shackle, radio-frequency-transparent cover, and battery door. The components of different implementations of the improved padlock may have different relative dimensions and may be differently arranged.

Figure 2B:
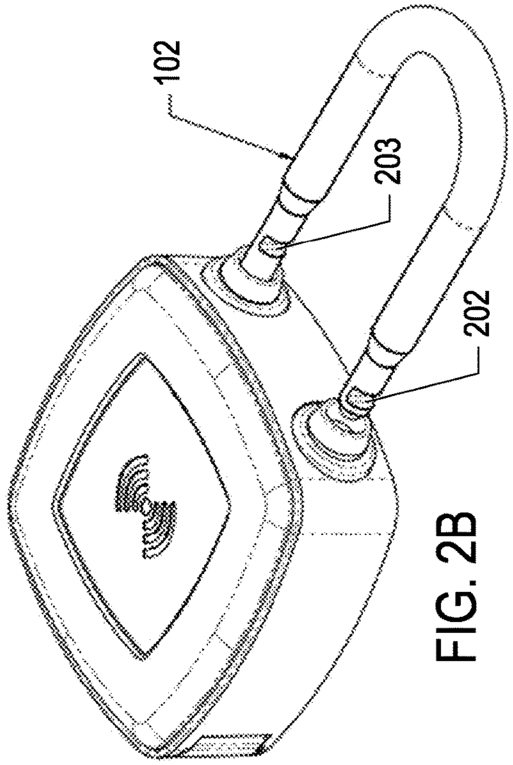
FIGS. 2A-D show exterior views of the padlock in different functional states.
Figure 2D:
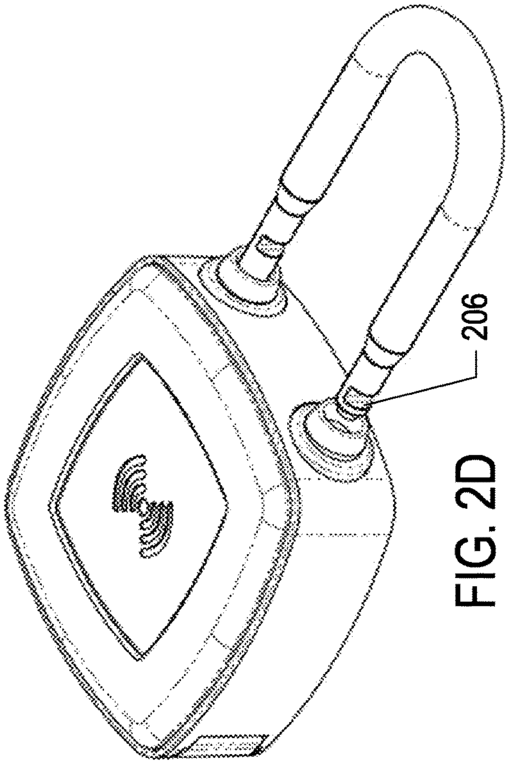
Figure 2A:
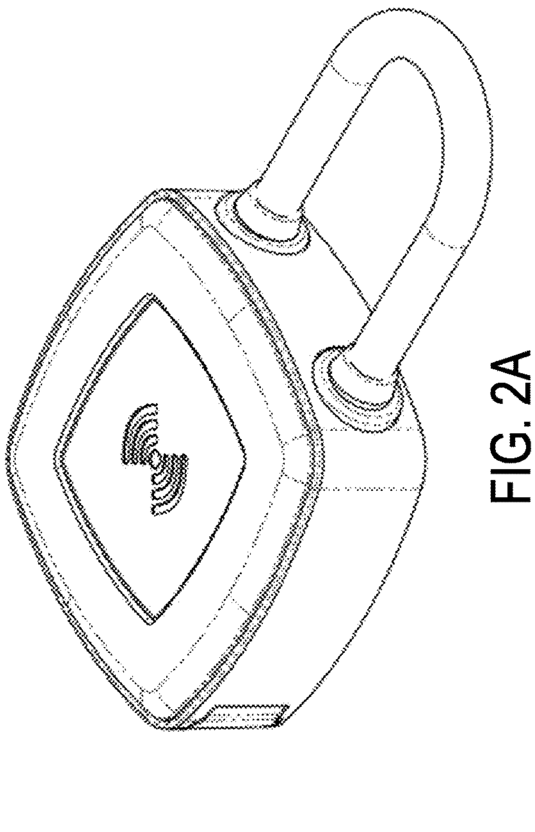
Figure 2C:
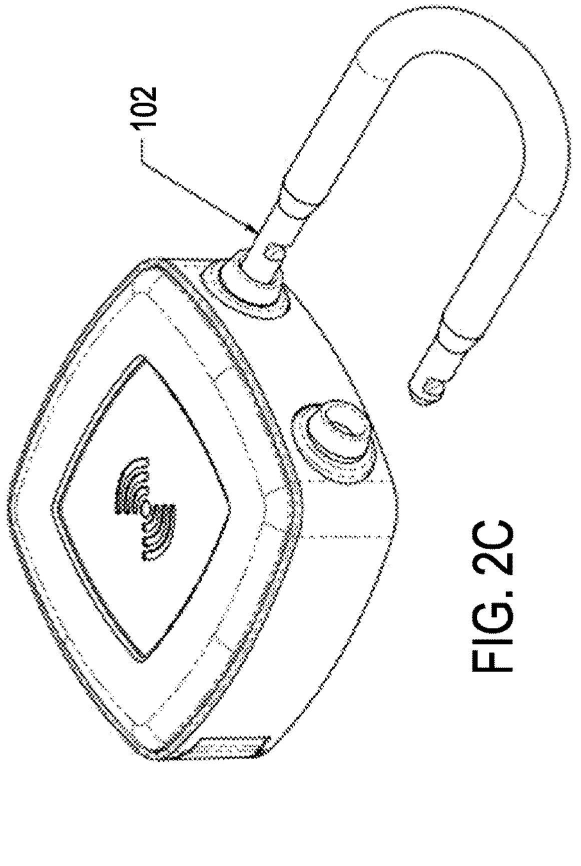

FIGS. 2A-D show exterior views of the padlock in different functional states. The improved padlock is locked, in FIG. 2A. In FIG. 2B, the improved padlock is unlocked, with the shackle 102 extended outward from the housing, revealing two notches 202-203 in the arms of the shackle into which edges of cut outs within a latch plate, discussed below, are inserted in order to lock the shackle within the housing of the improved padlock. As shown in FIG. 2C, the shackle 102 is able to rotate about the longer arm of the shackle when the improved padlock is unlocked. As shown in FIG. 2D, the shorter arm of the shackle is aligned with port 206 as a first step in locking the improved padlock. Once aligned, the shackle is depressed to insert the shorter shackle arm into the port 206 to a point at which the notches 202-203 in the shackle arms e shown in the section 702 with the latch plate to lock the improved padlock, compressing an internal spring associated with the longer shackle arm.

Figure 3A:
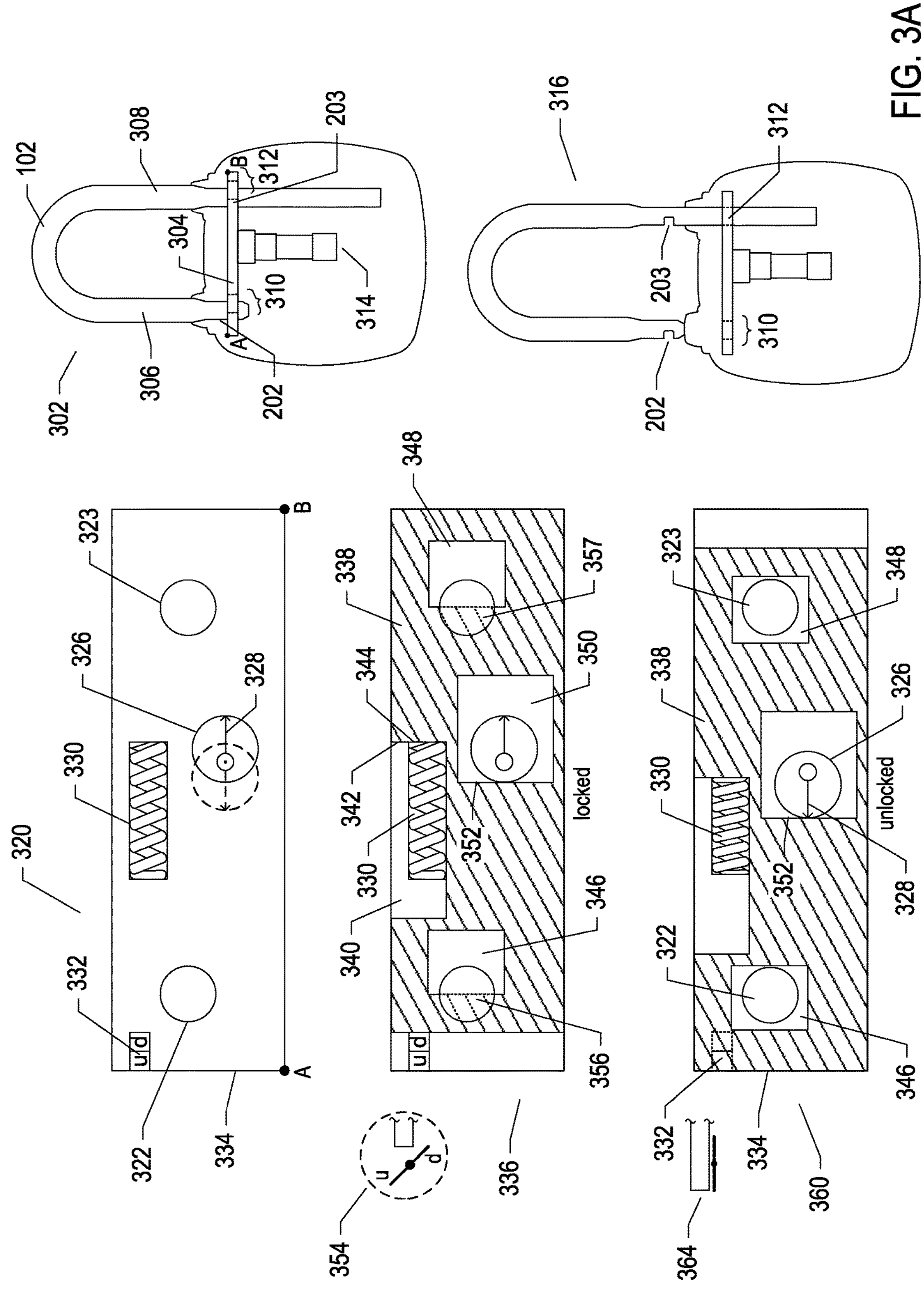
FIGS. 3A-B illustrate three internal states of the currently disclosed improved padlock using simplified depictions.
Figure 3B:
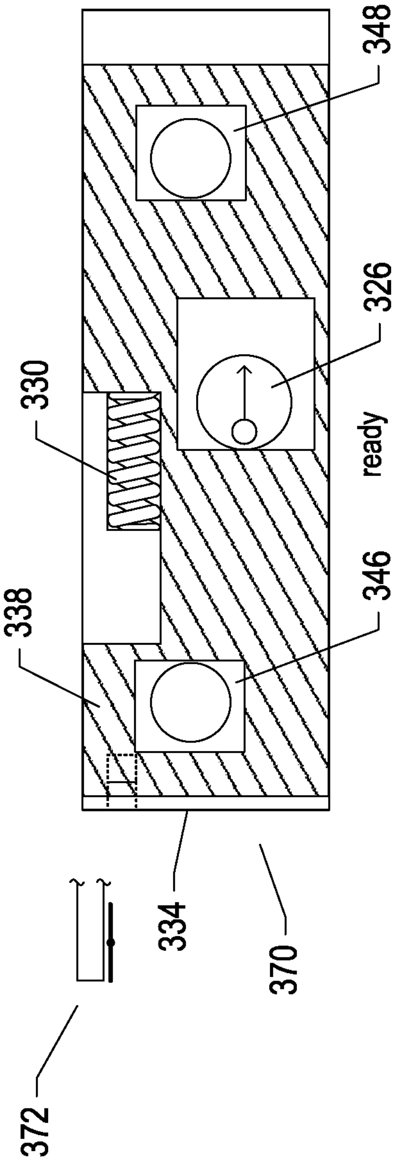

FIGS. 3A-B illustrate three internal states of the currently disclosed improved padlock using simplified depictions. These three internal states are further discussed with reference to more detailed figures, below. The simplified depictions shown in FIGS. 3A-B do not indicate the actual detailed shapes and relative sizes of the depicted internal components of the improved padlock but, instead, show simplified representations of certain of the internal components in order to simply illustrate interactions of the components that lead to the three internal states.

A section 302 through the improved padlock, in the locked state, is shown on the right-hand side of FIG. 3A. The shackle is held within the padlock by portions of a latch plate 304 inserted into the notches 202-203 of the shorter 306 and longer 308 shackle arms. Two pairs of short dashed lines 310 and 312 indicate apertures in the latch plate that, when aligned with the shackle arms, allow the shackle to be released and pushed outward from the housing by decompression of a compressed spring associated with the longer shackle arm. However, in the locked state, the portions of the latch plate inserted into the notches 202-203 of the shackle arms prevents the shackle from moving upward or downward in the vertical direction. A cylindrical internal component 314 within the padlock housing is an electric motor that rotates a cam, discussed below, which results in translation of the latch plate across a horizontal internal surface. A section 316 through the improved padlock in the open state is shown in the lower right-hand portion of FIG. 3A. Once the latch plate has been moved to the left, aligning the apertures 310-312 in the latch plate with the shackle arms, the shackle is translated upward by the force of the decompressing spring associated with the longer shackle arm. The longer shackle arm remains rotationally coupled within the housing of the improved padlock. A switch 332, further discussed below, is depressed when the latch plate moves from the right of the internal surface to the left edge 334 of the internal surface and is released when the latch plate moves rightward along the internal surface away from the left edge 334 of the internal surface.

A top-down view of the internal surface 302 on which the latch plate is translationally mounted is shown at the top of FIG. 3A. This internal surface includes two apertures 322-323 through which the two shackle arms 306 and 308 extend, when the improved padlock is in the locked state, as shown in section 302. A vertical motor shaft extends upward, through the surface, and is asymmetrically coupled to a cam 326. A short solid arrow 328 indicates the current rotational position of the cam. A horizontally mounted spring 330 is compressed when the latch plate is translated to the left by rotation of the cam, as discussed below, and the force produced when the spring decompresses translates the latch plate to the right when not prevented by the cam.

A second top-down view 336 shows the latch plate 338 translationally mounted to the internal surface. The latch plate 338 is indicated by crosshatching. The second top-down view shows the position of the latch plate when the improved padlock is in the locked state, as shown in section 302. The latch plate includes four cut outs or apertures: (1) a cut out 340 that accommodates the spring 330 that extends upward from the internal surface, with a right edge 342 of cut out 340 adjacent to the right end of the spring 344; (2) a left shackle-arm aperture 346 shown in cross-section as short parallel dashed lines 310 in section 302; (3) a right shackle-arm aperture 348 shown in cross-section as short parallel dashed lines 312 in section 302; and (4) a cam aperture 350 that accommodates the cam, which extends upward from the internal surface. The left edge 352 of the cam aperture 350 is adjacent to the left edge of the cam, and held in that position by a residual force exerted by the spring 330 in a least-compressed state. Inset 354 shows a view of the switch 332 when viewed from the front edge of the latch plate, as in section 302. The latch plate 338 is translated to the right-hand side of the internal surface and does not cover the switch, when the improved padlock is in the locked state. The left portion of the switch is slanted upward and the right portion of the switch is slanted downward. Note that portions of the latch plate 356-357 are inserted into the notches 202-203 of the shackle arms, locking them from translation in a direction perpendicular to the latch plate.

A third top-down view 360 shows the latch plate and internal surface when the improved padlock is in the unlocked state, shown in section 316. The latch plate 338 has been translated leftward so that the left edge of the latch plate is coincident with the left edge 334 of the internal surface. The translation has occurred due to rotation of the cam 326, as indicated by position arrow 328. The rotation of the cam has exerted a continuous force against the left edge 352 of the cam aperture 350. Translation of the latch plate leftward has resulted in compression of spring 330. The left shackle-arm aperture 346 and the right shackle-arm aperture 348 are now centered over the two apertures 322-323 in the internal surface through which the shackle arms extend when the improved padlock is in the locked state. The switch 332 is now covered by the latch plate, which has forced the switch into the horizontal position 364. In other words, activation of the motor 314 to rotate the cam has resulted in translation of the latch plate leftward, releasing the shackle arms to allow the shackle to be vertically translated upward under the force produced by decompression of the spring associated with the longer shackle arm. The leftward translation of the latch plate has, in addition, compressed spring 330.

Finally, FIG. 3B shows a top-down view 370 of the latch plate and internal surface when the currently disclosed improved padlock is in a ready state. The ready state is a state from which the padlock can be manually locked by depressing the shackle downward, assuming that the shackle is rotationally oriented to align the shorter shackle arm with the port through which it extends into the housing of the improved padlock in the locked state. The ready state is obtained when the motor is activated to rotate the cam 326 back to the position of the cam when the padlock is in the locked state, as shown in top-down view 336 in FIG. 3A. The latch plate 338 is shown to have translated slightly rightward from the left edge 334 of the internal surface. The switch is still mostly covered by the latch plate and is in a horizontal position 372. The spring 330 is still mostly compressed and, were the latch plate not inhibited from further translation to the right by the left edges of the left shackle-arm aperture 346 and the right shackle-arm aperture 348 resting against the left and right shackle arms, would further uncompress forcing the latch plate further to the right with respect to the internal surface. When the shackle is manually depressed downward by a user into the locked position, the left edges of the left shackle-arm aperture 346 and the right shackle-arm aperture 348 can then further translate to the right to engage with the notches in the shackle arms, and this further rightward translation is automatically driven by decompression of the spring 330. Thus, the ready state is essentially a ready-to-be-locked state from which the locked state of the disclosed improved padlock is obtained by manual depression of the shackle towards the padlock housing. While cam is an asymmetrically mounted cylindrical section in FIGS. 3A-B, the cam may have various alternative shapes. While the cam shown in FIGS. 3A-B has essentially two stable positions corresponding to the locked and unlocked states, at 0° and 180° rotational positions of the motor shaft, cams of other shapes and types may have used, including cams with more than two stable positions separated by less than 180° of rotation of the motor shaft.

Figure 4:
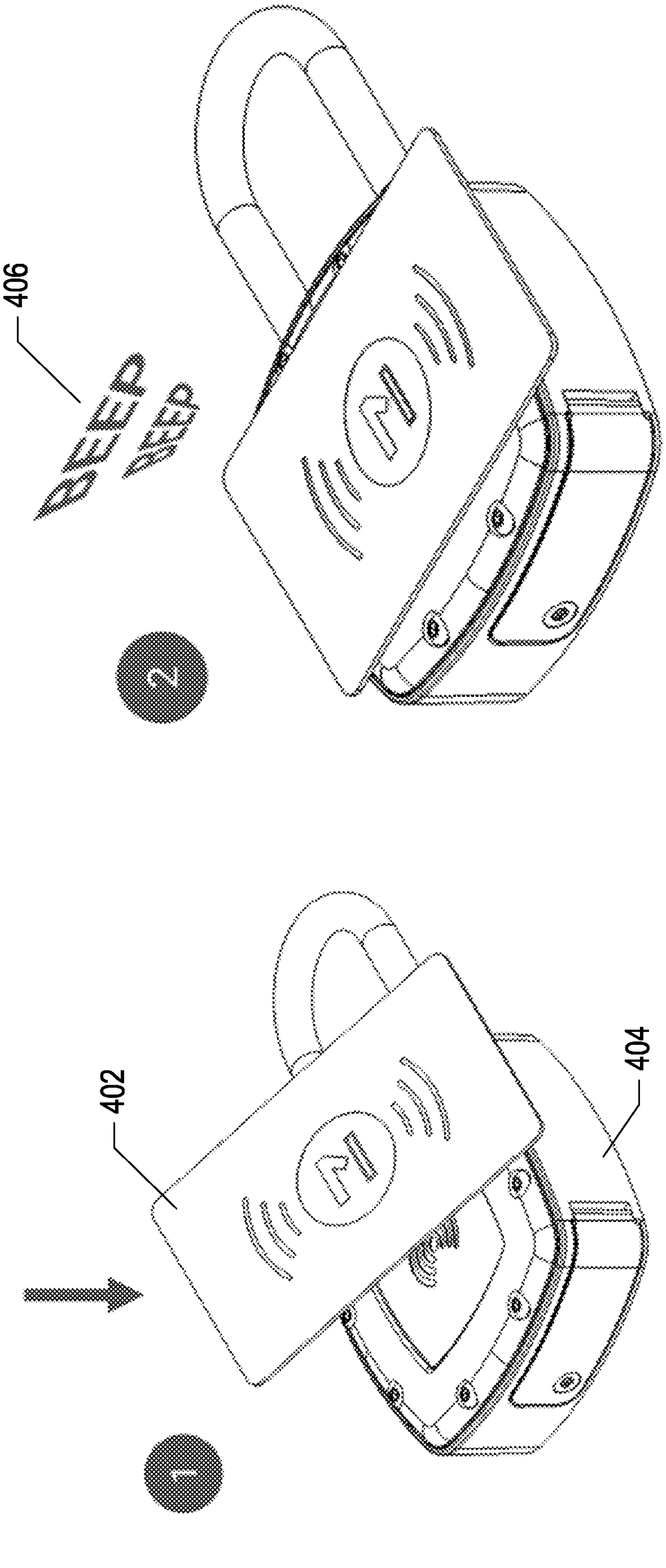
FIGS. 4-14 each provides an additional accurate representation of one implementation of the improved padlock, including the internal components of the implementation of the improved padlock.
Figure 5:
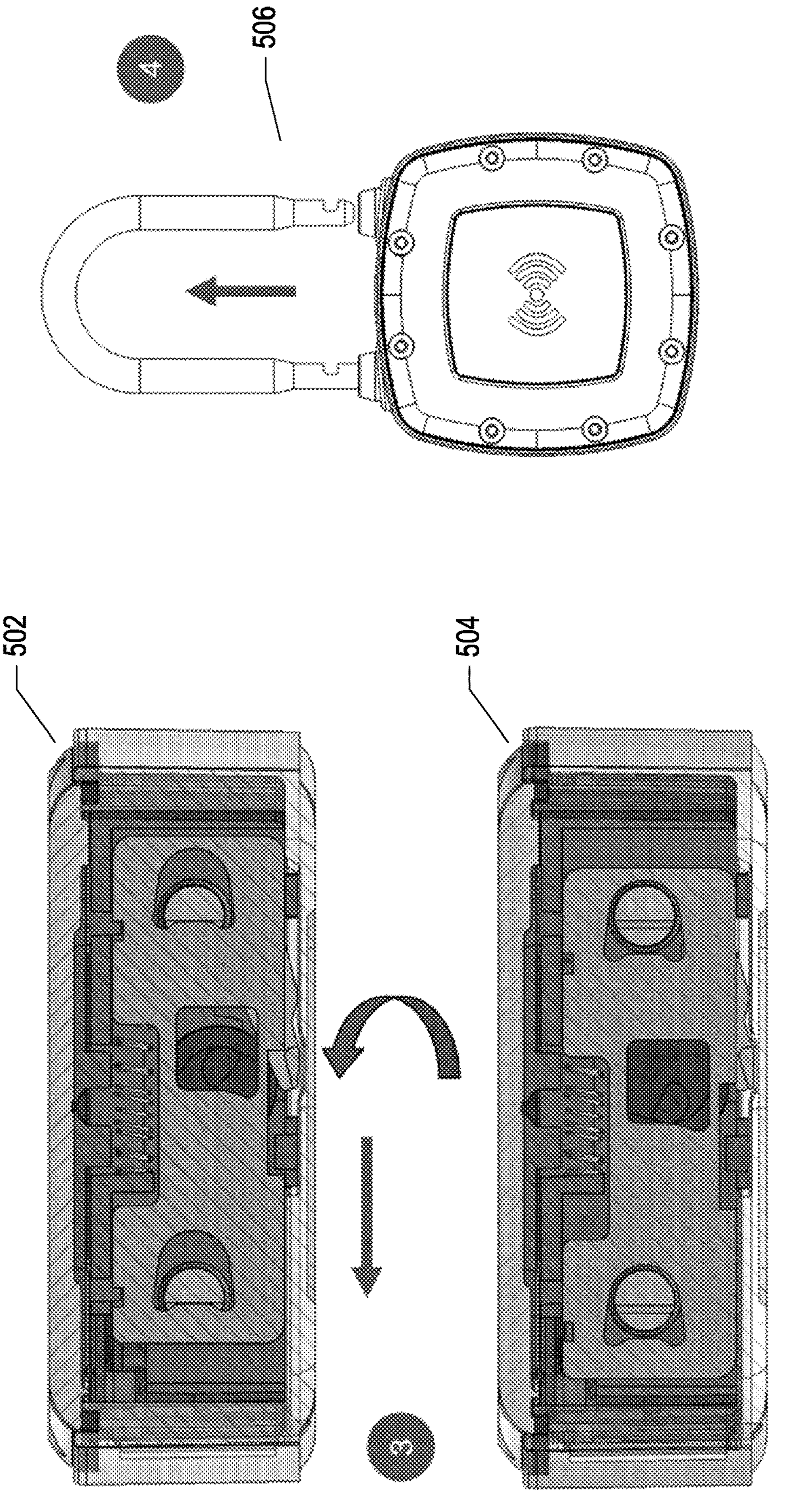
Figure 6:
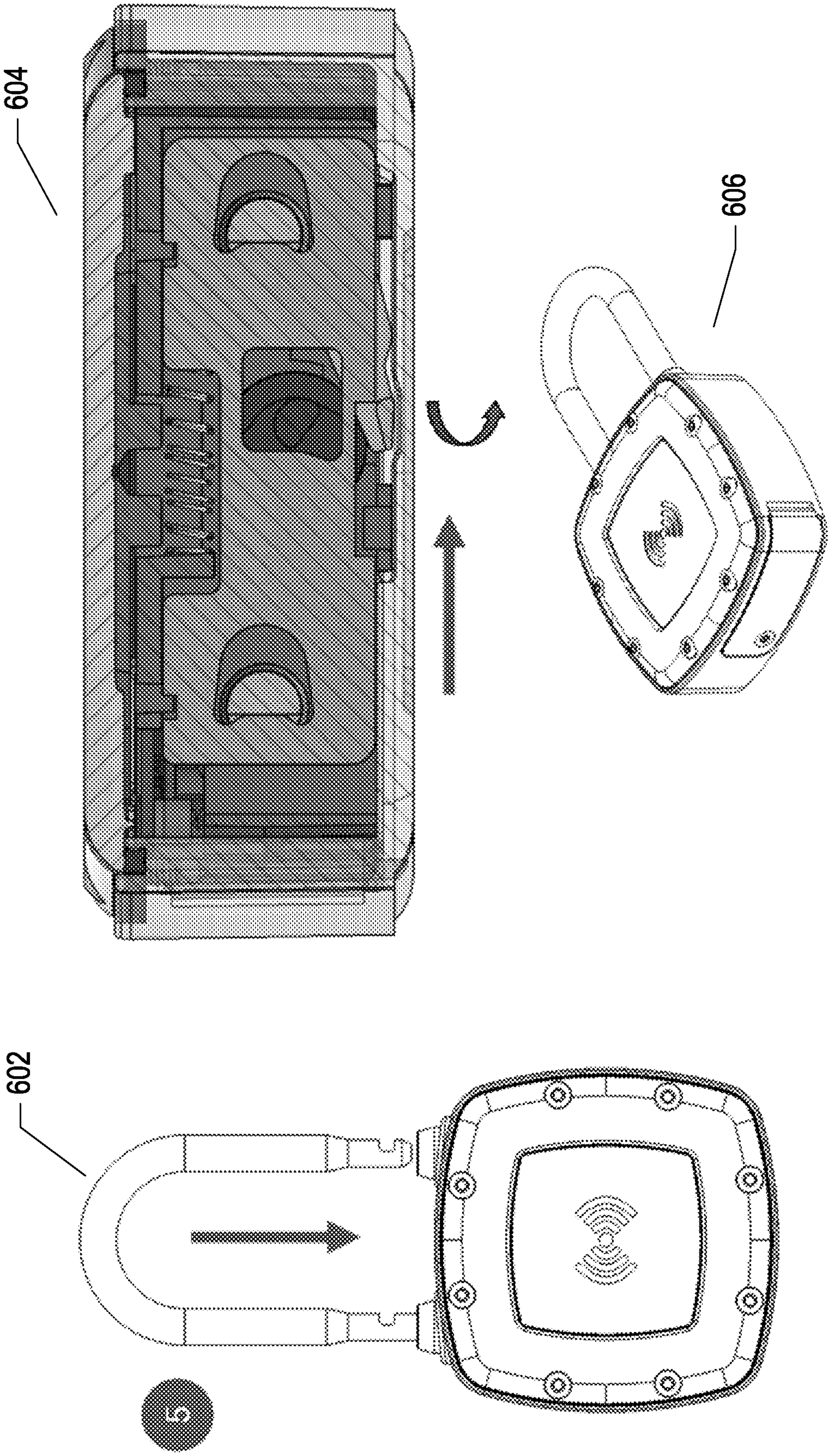
Figure 7:
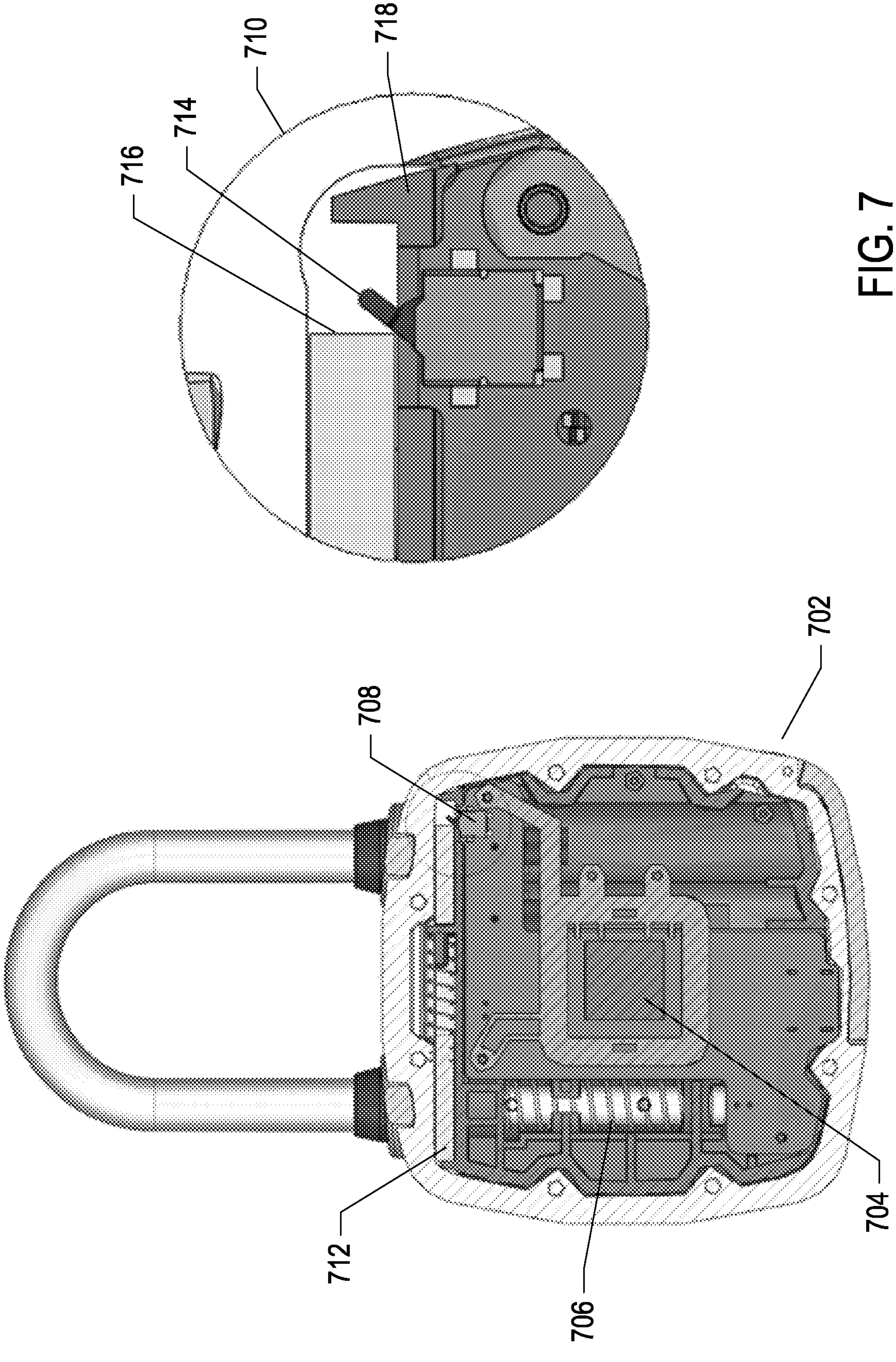
Figure 8:
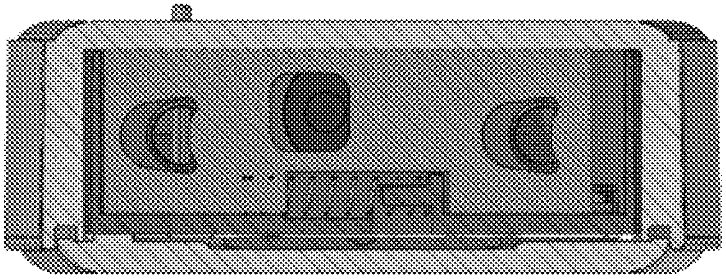
Figure 8:
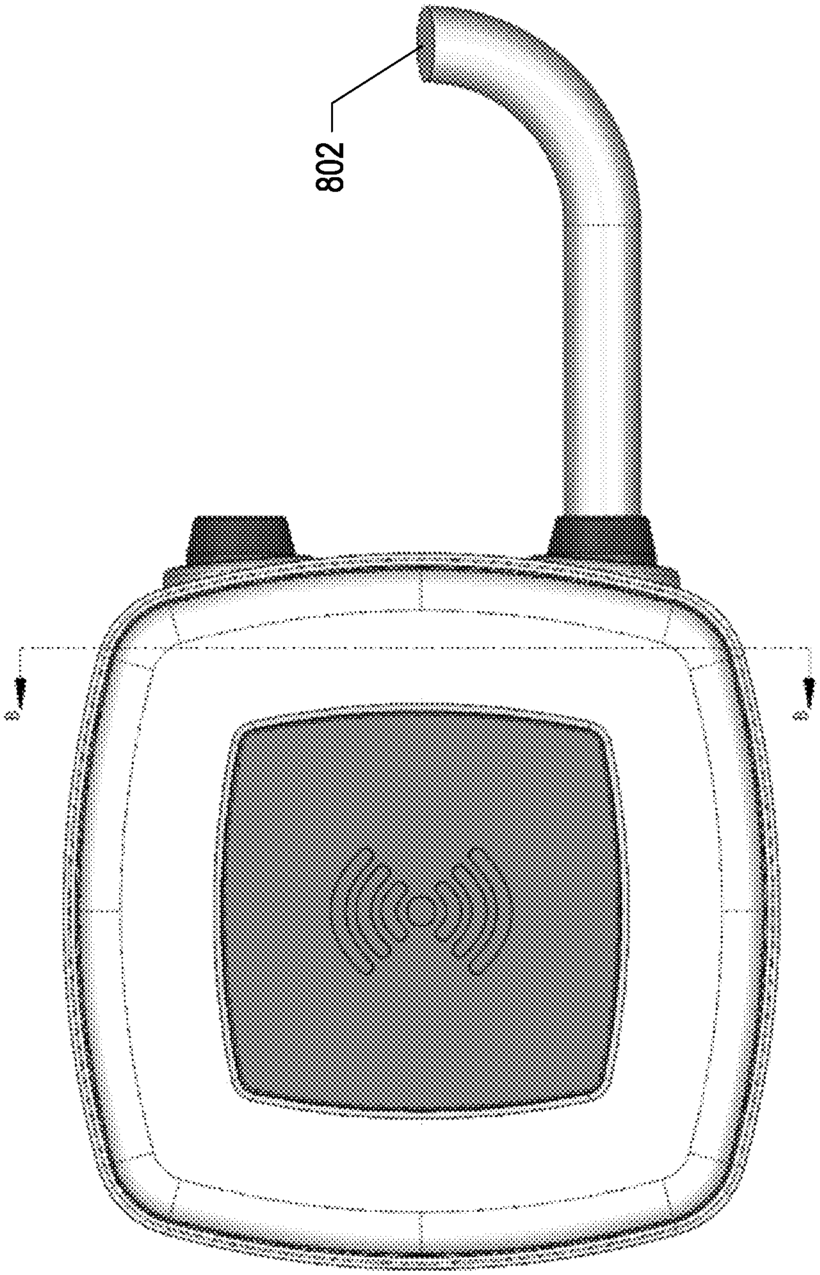

FIGS. 4-14 each provides an additional accurate representation of one implementation of the improved padlock, including the internal components of the implementation of the improved padlock. FIGS. 4-8 illustrate a sequence of operations that place the improved padlock in various different functional states. In FIG. 4, in a first step, a key card 402 is placed in proximity to the improved padlock 404. When the improved padlock senses the presence of the key card, receives information from the key card, such as a numerical identifier, and determines that the numerical identifier corresponds to a key card that is currently authorized for opening the improved padlock, the improved padlock emits a short sequence of audible signals, or beeps 406. In alternative implementations, the key card may include logic to retrieve information from the padlock, compare that information to information stored in the key card, and, when the comparison indicates that the key card is authorized to open the padlock, transmit an open command to the padlock. Communication between the key card and the improved padlock can be implemented using a variety of different technologies, including radio-frequency-identification ("RFID") technologies, Bluetooth technologies, and other such communications technologies. As shown in FIG. 5, the improved padlock is initially in the locked state, with the latch plate engaged with notches in the shackle arms 502. In response to detecting the presence of an authorized key card, the internal control logic within the improved padlock activates the electric motor to rotate the cam in order to move the latch plate to the left, in a third step, and unlock the improved padlock 504, resulting in the compressed spring associated with the longer shackle arm decompressing and vertically translating the shackle upward to release that shackle, in a fourth step 506. Subsequently, in a fifth step shown in FIG. 6, the shackle is manually depressed 602 resulting in the latch plate re-engaging with the notches in the shackle arms 604 and returning the improved padlock to the locked state 606. FIG. 7 illustrates the switch used in the currently disclosed embodiment of the improved padlock. Certain of the internal components of the improved padlock are shown in section 702. These include the microprocessor 704 that, along with a memory, implements the internal control logic of the improved padlock, the spring 706 associated with the longer shackle arm that is compressed when the shackle arm is depressed into the locked position and decompresses to force the shackle arm upward during an unlocking operation. The switch 708 is shown at greater magnification in inset 710. When the latch plate is in a locked position 712, the switch is in an upward position 714. When the latch plate is translated to the right, in the orientation of the improved padlock shown in FIG. 7, the edge of the latch plate 716 depresses the switch 714 as it moves across the switch towards the right end of the internal surface 718. The switch emits a signal when the state of the switch changes from the upward position shown in FIG. 7 to the horizontal position and also emits a signal when the state of the switch changes from the horizontal position back to the upward position shown in FIG. 7. FIG. 8 illustrates a mechanical disabling of the improved padlock. In this scenario, the shackle has been cut 802. In order to remove the padlock from a latch, cable, or chain, the shackle arms need to be rotated in order to provide a large enough opening for the shackle to be disengaged from the latch, cable, or chain. When the shackle arms are rotated, the rotation results in a translation force applied to the latch plate that moves the latch plate over the switch. Detection of a state change of the switch, from the up to the horizontal position when the improved padlock is in the locked state, results in the improved padlock emitting one or more alarm signals. The alarm signals may include a loud audible alarm and, in certain implementations, may also include transmission of an alarm notification to a remote controller. As discussed further, below, the improved padlock includes communications devices and logic that allow the improved padlock to communicate through network communications with a remote controller, such as through a Wi-Fi network or an IoT-based mesh network.

While the example unlocking operation, discussed above with reference to FIGS. 4-7, involves key-card initiation, there are many other types of devices and inputs that can initiate unlocking, in different implementations. These may include mechanical devices incorporated in the padlock or external to the padlock, electronic signals received from remote controllers, including applications running on smart phones and specialized control systems in retail environments, open commands received through radio-frequency communications, and scheduled open-events generated from stored schedules by padlock logic.

Figure 9:
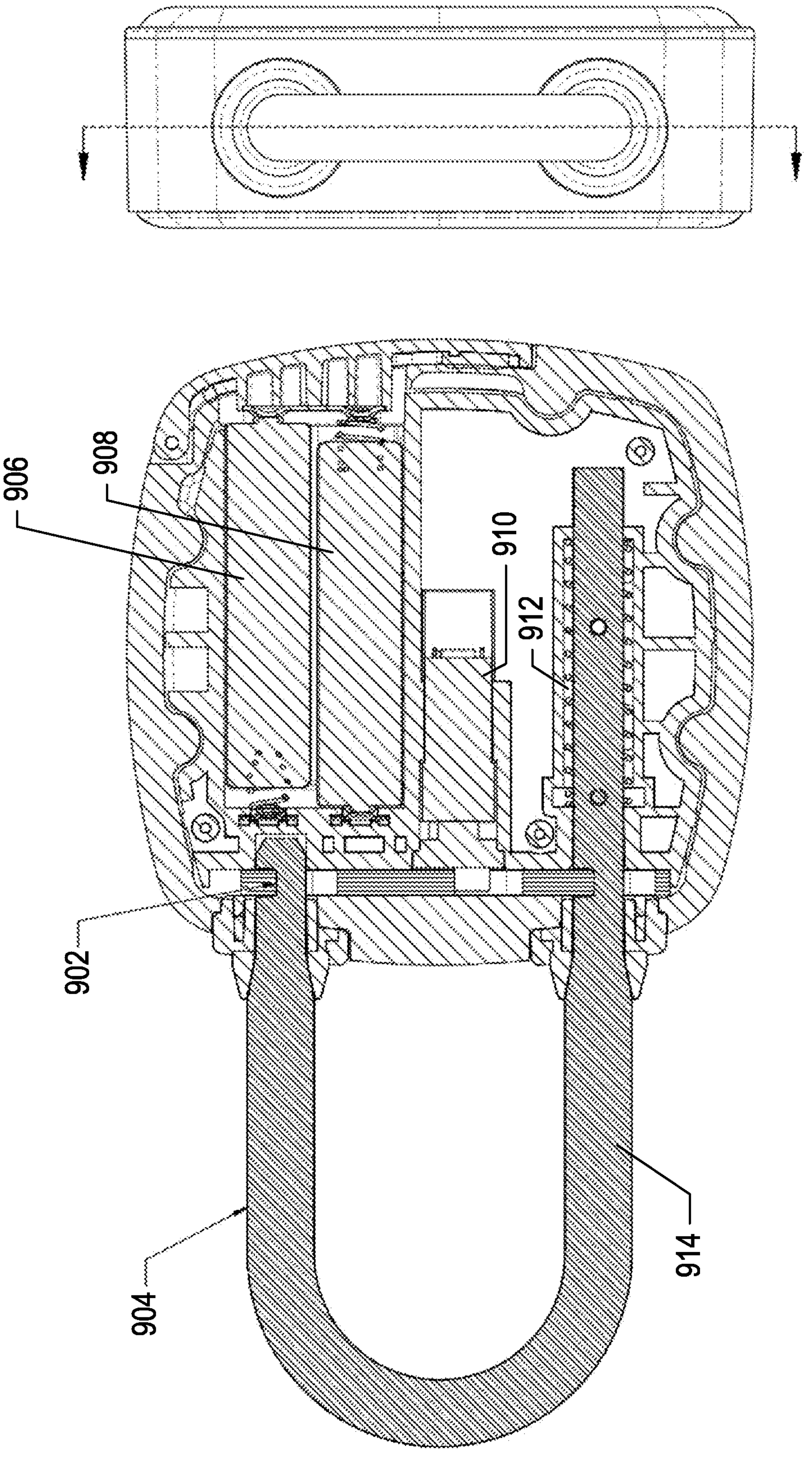

FIG. 9 shows a sectional view of the disclosed implementation of the improved padlock. The improved padlock is in the locked state in FIG. 9. The edges of the shackle-arm apertures in the latch plate, such as edge 902, are shown inserted into the corresponding notches of the shackle arms, such as shackle arm 904. The sectional view also shows two batteries 906 and 908 that provide an internal energy source for the improved padlock. The motor 910 and the spring 912 associated with the longer shackle arm 914 are shown in greater detail than in previous figures.

Figure 10:
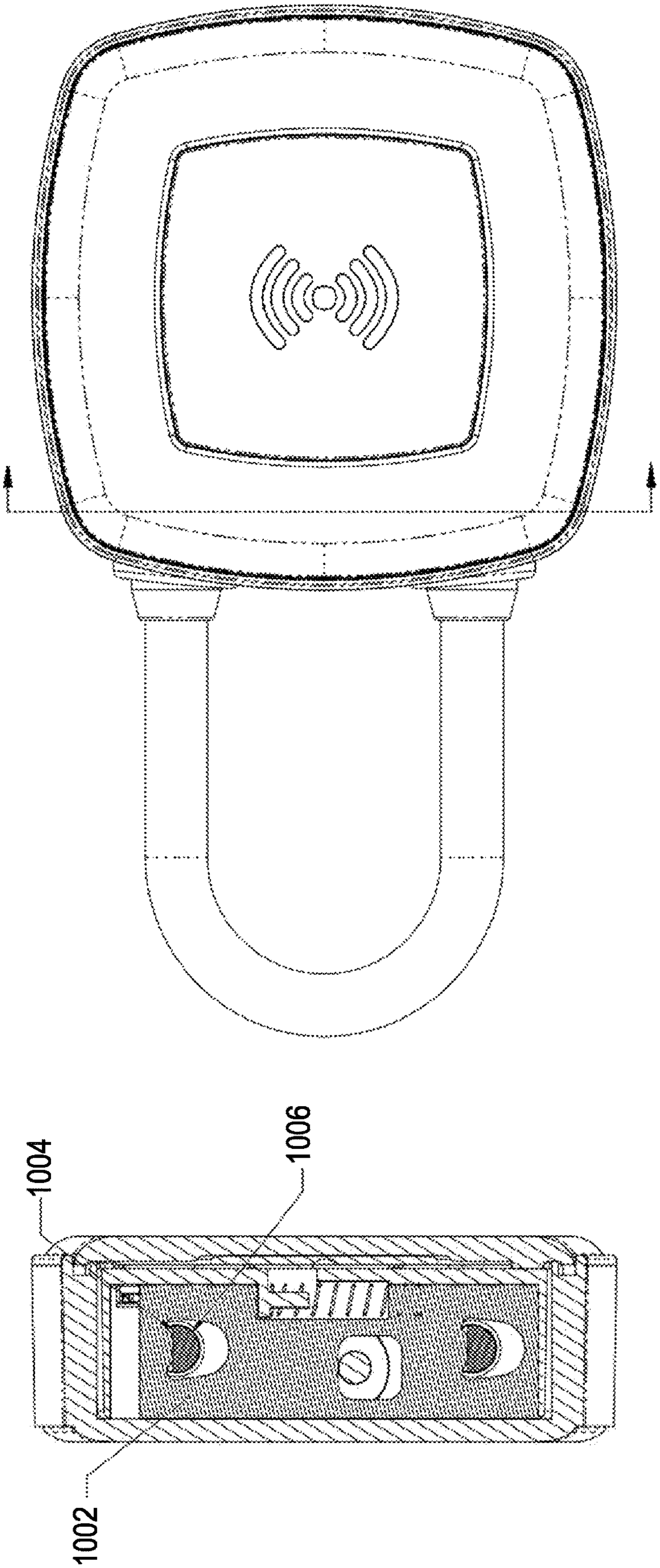
Figure 11:
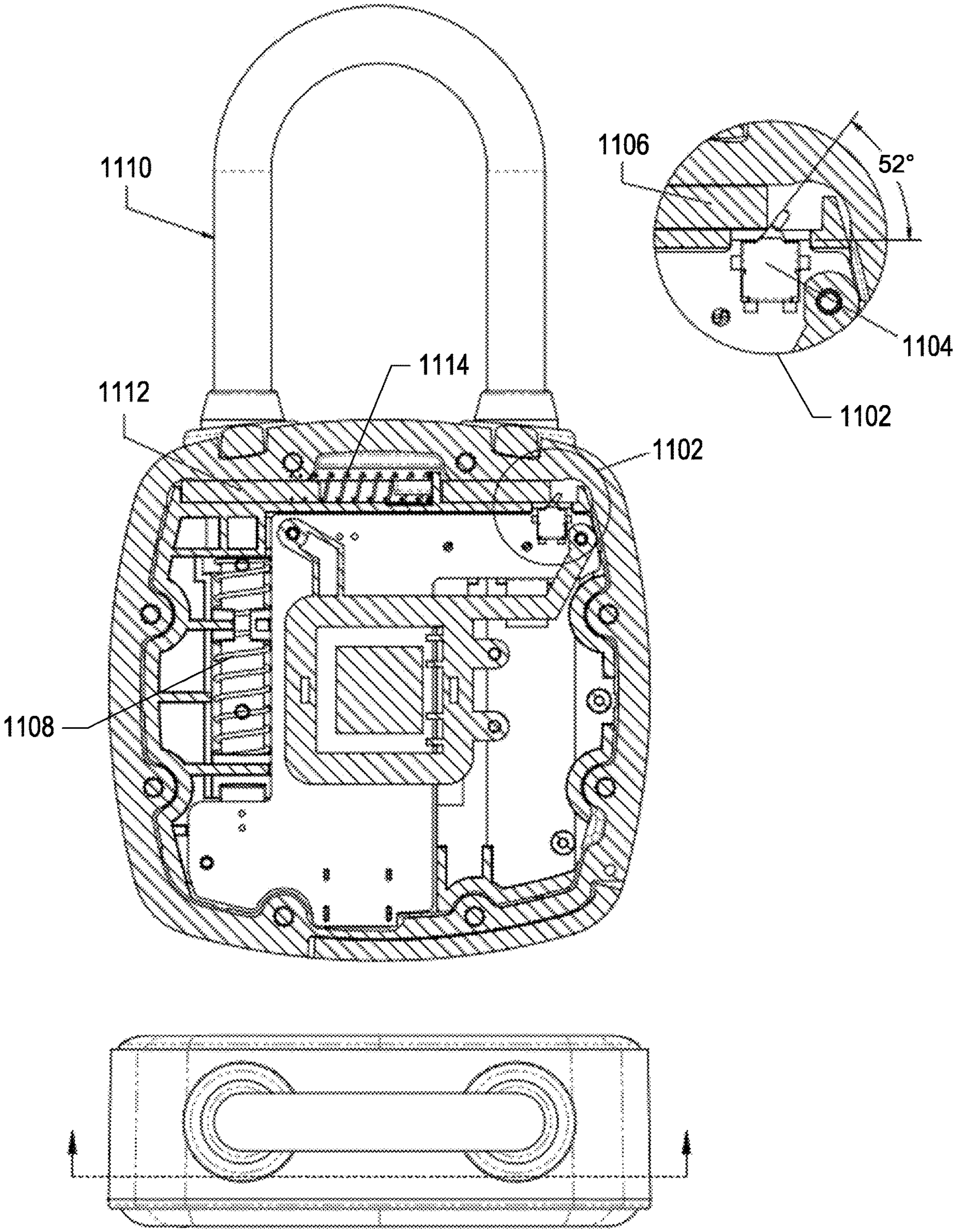
Figure 12:
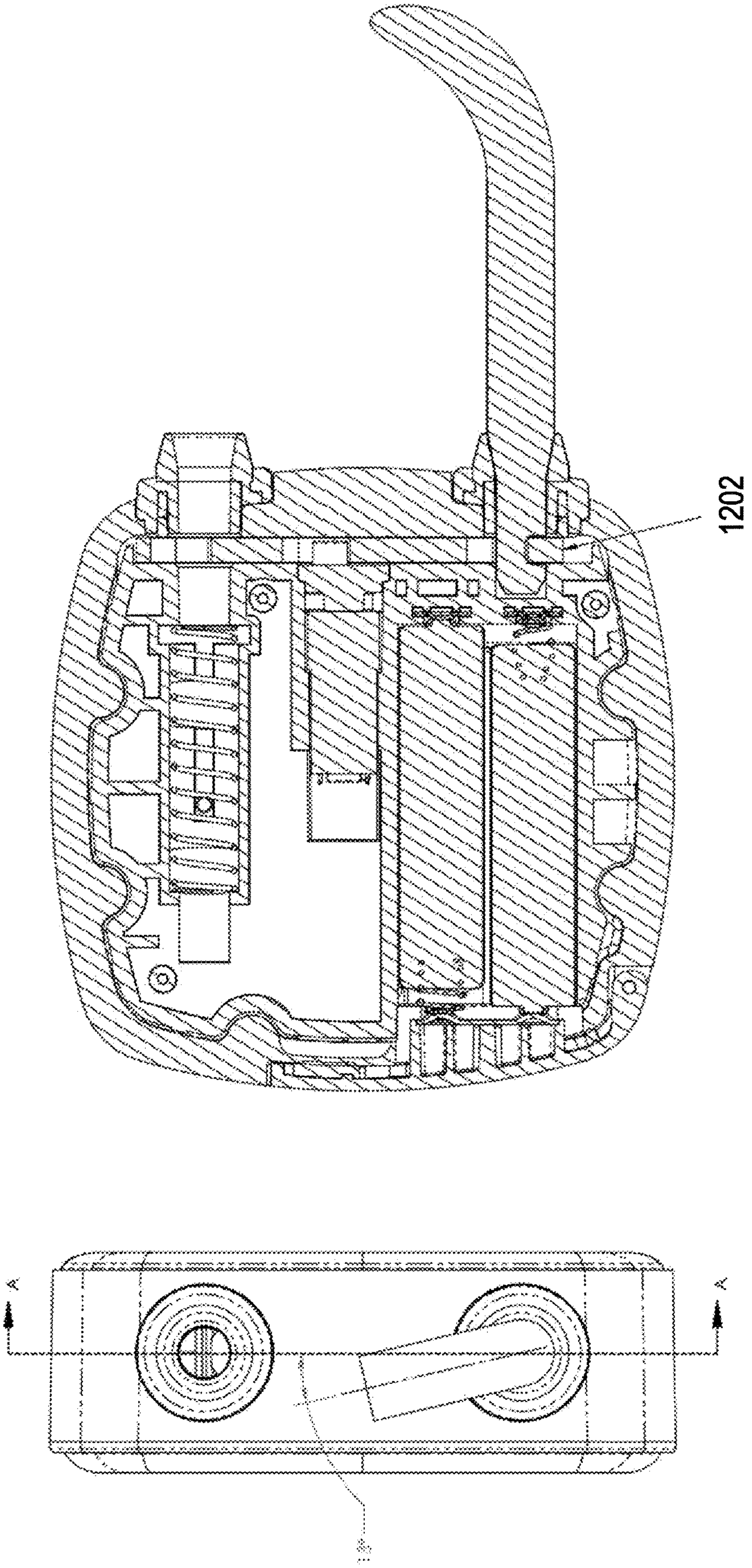
Figure 13:
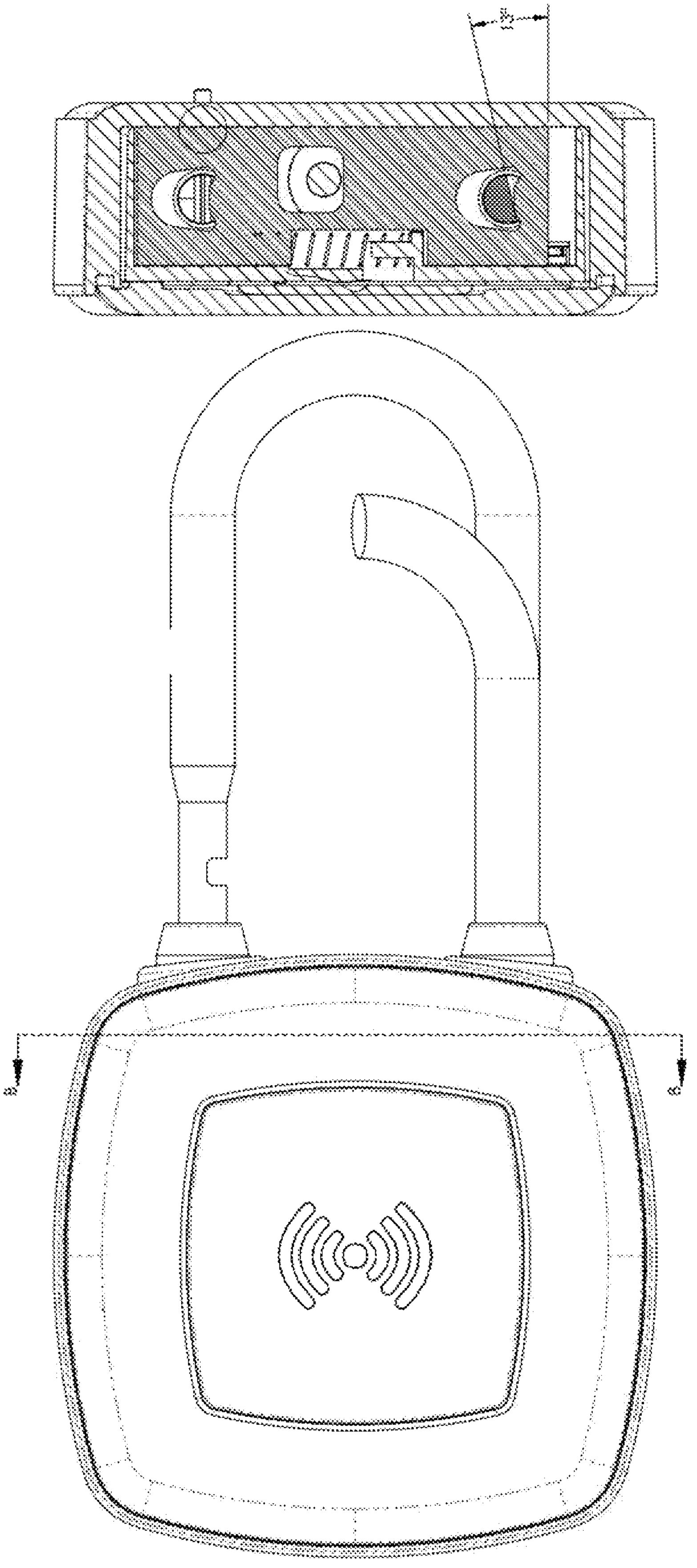
Figure 14:
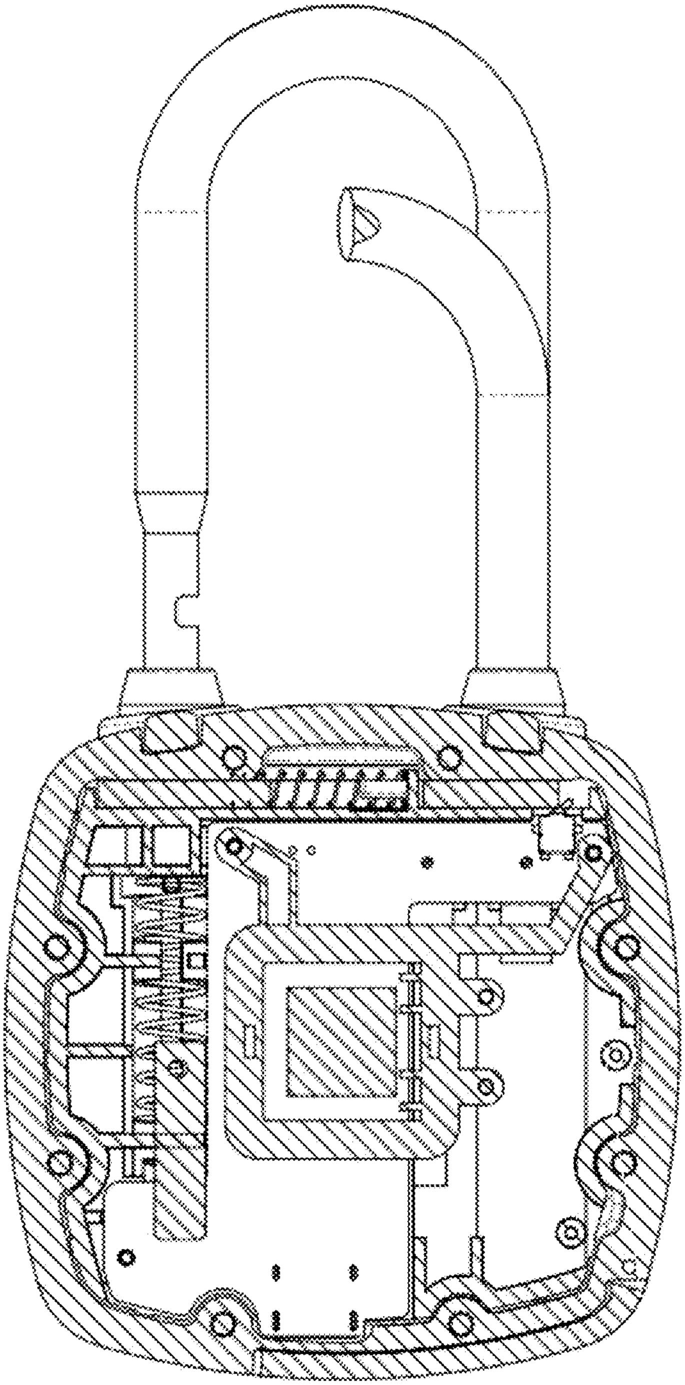
Figure 14:
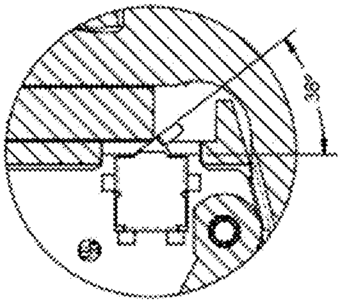
Figure 14:
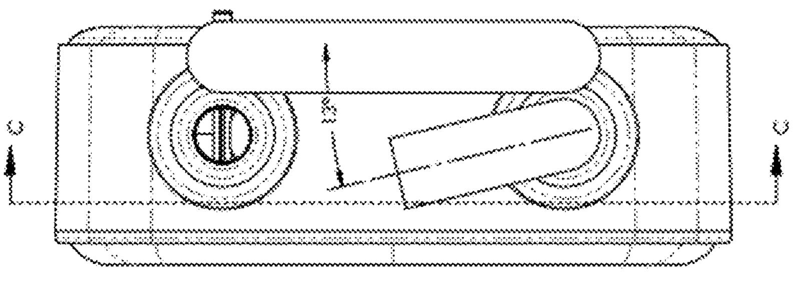

FIG. 10 shows an external view of the improved padlock as well as a top-down view of the latch plate 1002 in the locked position with portions of the latch plate inserted 1004 into the notches of the shackle arms, such as shackle arm 1006. FIG. 11 shows a section through the improved padlock that includes additional details. Inset 1102 shows the switch 1104 and the end portion of the latch plate 1106 that, when translated rightward, depresses the switch. The spring 1108 associated with the long shackle arm 1110 is clearly shown in FIG. 11, as is the latch plate 1112 and the spring 1114 that is compressed and decompressed by translation of the latch plate, as discussed above. FIG. 12 shows a similar section of the improved padlock when the shackle has been cut. Portions of the latch plate 1202 are still inserted into the notches in the shackle arms as the shackle arms have not yet been rotated sufficiently to force the latch plate rightward to activate the switch. FIGS. 13 and 14 show similar depictions of the improved padlock in the same state as in FIG. 12.

Figure 15:
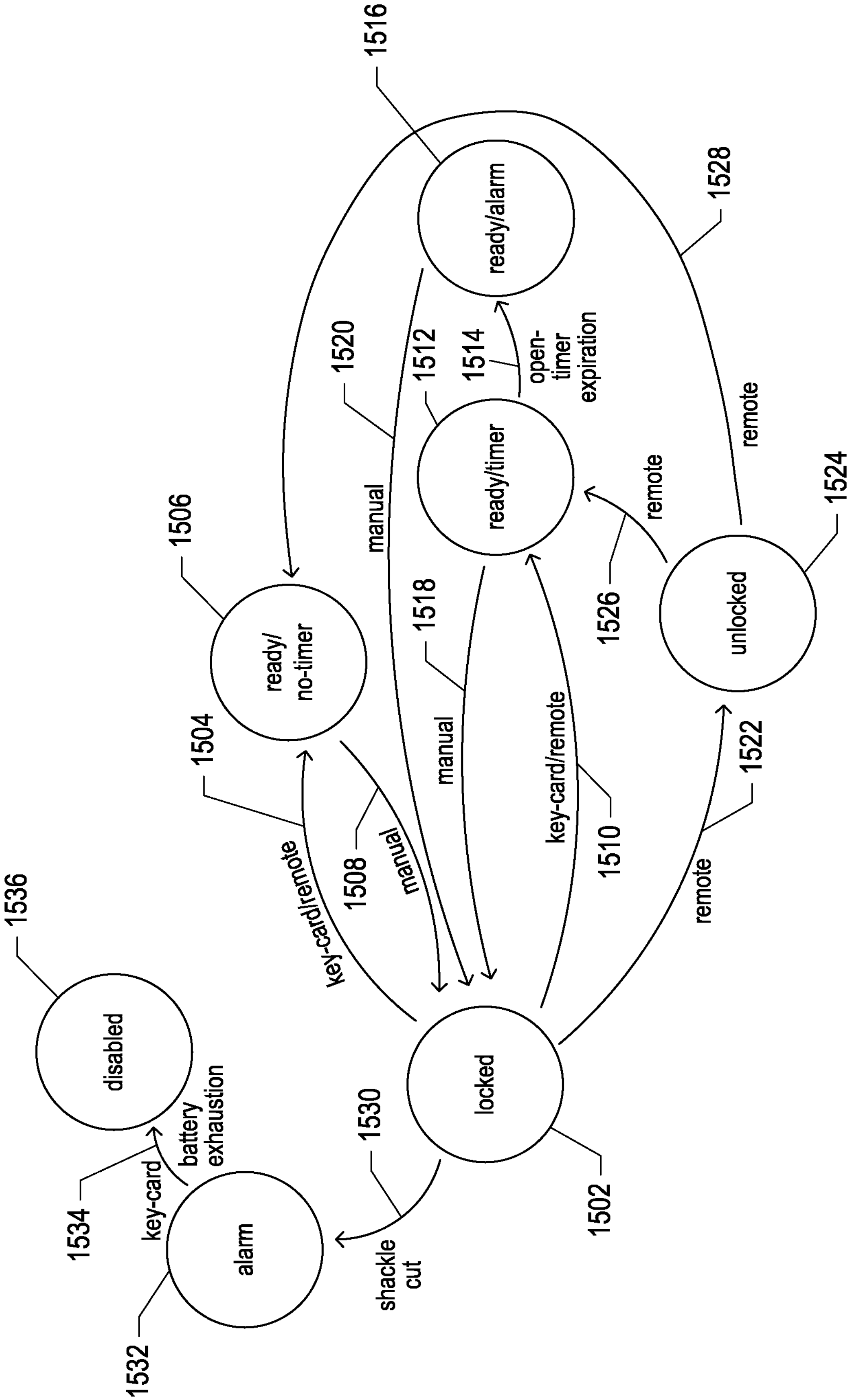
FIG. 15 provides a state-transition diagram for one implementation of the currently disclosed improved padlock.

FIG. 15 provides a state-transition diagram for one implementation of the currently disclosed improved padlock. There are many different possible implementations and many different possible corresponding state-transition diagrams for those implementations. Certain implementations may provide additional states and additional features or may provide fewer or different states and fewer or different features. The state locked 1502 is the state in which both shackle arms are inserted into the housing of the improved padlock and locked by insertion of portions of the latch plate into corresponding notches of the shackle arms, as discussed above with reference to top-down view 336 in FIG. 3A. The state-transition diagram shows multiple transitions from the state locked to other states, each transition represented by a labeled, curved arrow. The first transition 1504 occurs when a key card is placed in proximity to the improved padlock or when an unlock command is received by the padlock from a remote controller. In this case, the improved padlock is either not configured to set an open timer or the command from the remote controller indicates that no open timer should be set. The transition places the improved padlock in a ready/no-timer state 1506. The general ready state is discussed above with reference to FIG. 3B. Transition 1508, effected when the shackle is manually depressed by a user, returns the improved padlock to the locked state 1502. A transition 1510 similar to transition 1504 places the improved padlock in the ready/timer state 1512. Transition 1504 occurs when the improved padlock is configured to set an open timer or when the command received from the remote controller indicates that an open timer should be set. The improved padlock remains in the ready/timer state 1512 until either the open timer expires, in which case the improved padlock transitions 1514 to the ready/alarm state 1516, or the shackle is manually depressed, in which case the improved padlock transitions 1518 back to the locked state 1502. In the ready/alarm state 1516, improved padlock emits an audible alarm to indicate that the improved padlock has remained unlocked for more than a maximum allowed amount of time. The alarm is silenced when manual depression of the shackle results in transition 1520, which returns the improved padlock to the locked state 1502. Transition 1522 occurs when the remote controller sends a command to the improved padlock in the locked state, which directs the improved padlock to remain in the fully unlocked state discussed above with reference to top-down view 360 in FIG. 3A. This places the improved padlock in the unlocked state 1524. A subsequent command received from the remote controller can result in either transition 1526, which places the improved padlock in the ready/timer state 1512, or transition 1528, which places the improved padlock in the ready/no-timer state 1506. When the improved padlock is in the unlocked state 1524, it cannot be locked since the latch plate is held in the unlocked position by the cam, as discussed above with reference to top-down view 360 in FIG. 3A. When the improved padlock is in the locked state 1502 and the shackle is cut, a transition 1530 places the improved padlock in the alarm state 1532. In this state, the improved padlock produces an audible alarm signal and may, in certain implementations, also send an alarm indication to the remote controller. The improved padlock transitions 1534 from the alarm state to the disabled state 1536 when an authorized key card is placed in proximity to the improved padlock or when the internal-energy source within the improved padlock is exhausted.

Figure 16:
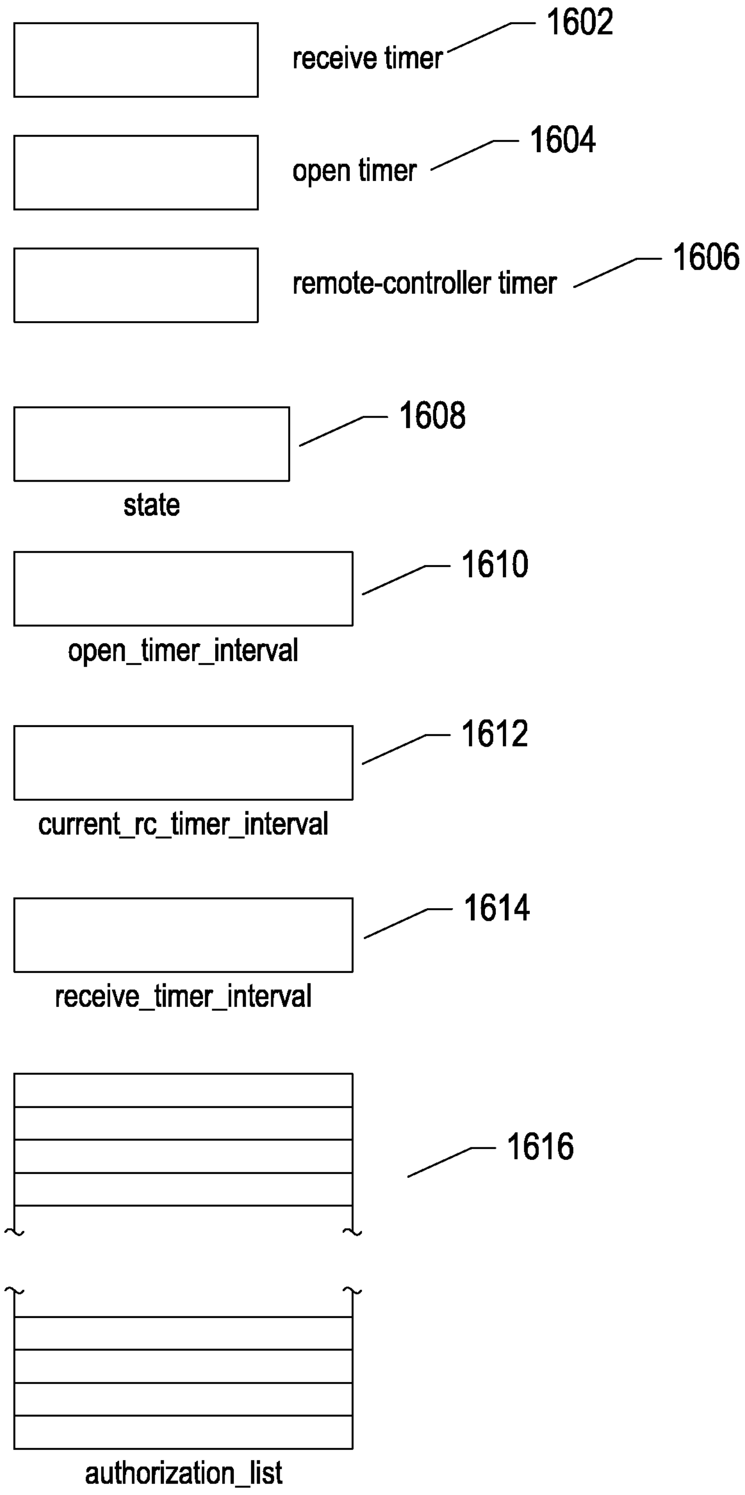
FIG. 16 illustrates a number of stored values and timers that are used by the internal control logic of the improved padlock in the currently disclosed implementation.

FIG. 16 illustrates a number of stored values and timers that are used by the internal control logic of the improved padlock in the currently disclosed implementation. The timers include: (1) a receive timer 1602 that controls a time period during which the improved padlock receives commands from the remote controller; (2) an open timer 1604 that controls the period of time during which a padlock can remain in the ready/timer state (1512 in FIG. 15) until an audible alarm is generated by the improved padlock following transition to the ready/alarm state (1516 in FIG. 15); and (3) a remote-controller timer 1606 that controls a sleep period during which the improved padlock does not activate the network-communications devices within the improved padlock and therefore does not communicate with the remote controller. The variable state 1608 contains a numeric indication of the current state of the padlock. The variable open_timer_interval 1610 stores a numeric indication of the period of time after which the open timer expires. The variable current_rc_timer_interval 1612 stores a numeric indication of the period of time prior to expiration of the remote-controller timer. The variable receive_timer_interval 1614 stores a numeric indication of the period of time following which the received timer expires. The array authorization_list 1616 stores the key-card identifiers associated with key cards that are currently authorized to be used to unlock the improved padlock.

Figure 17:
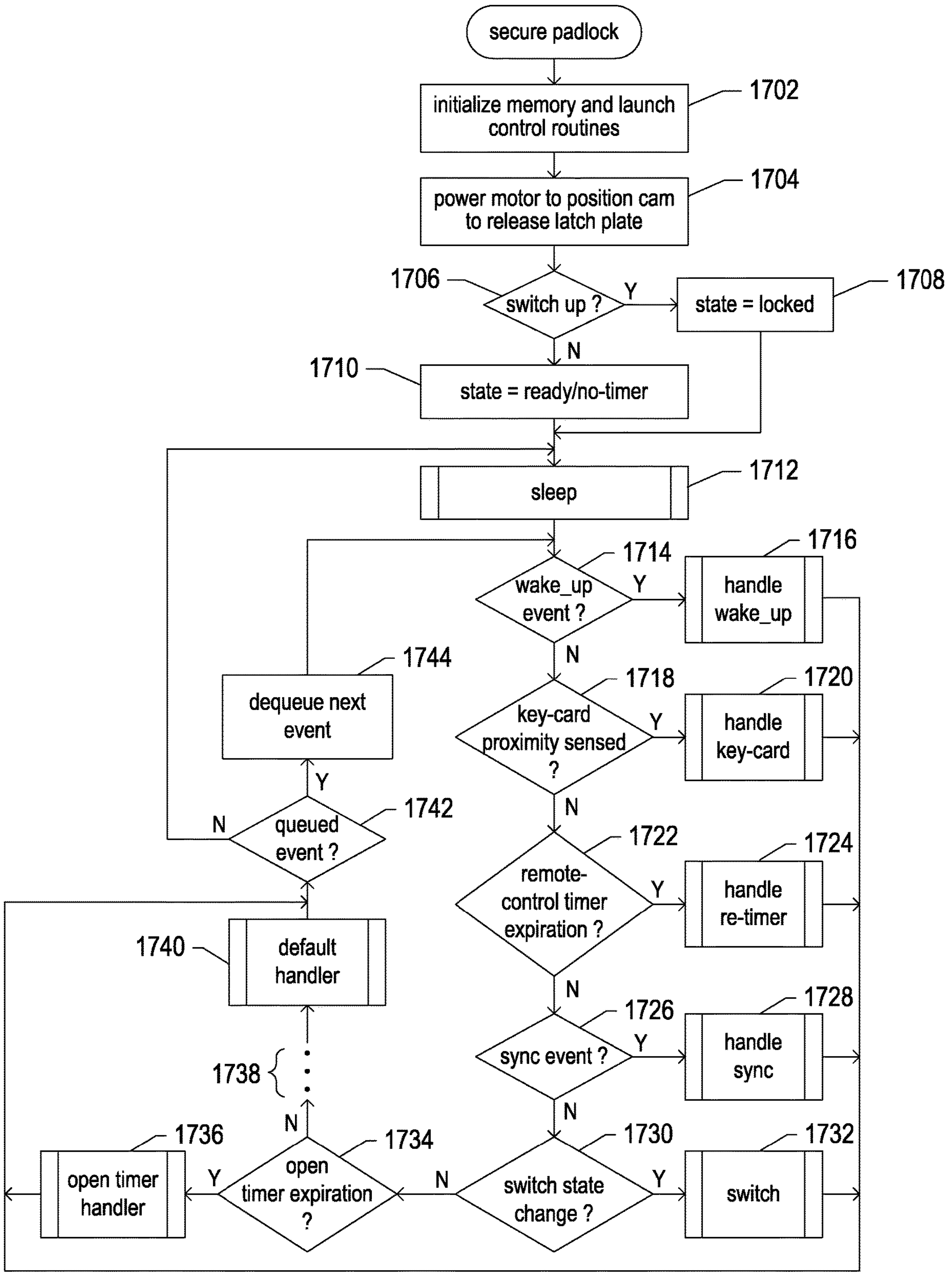
FIG. 17 provides a control-flow diagram for the internal control logic of the currently discussed implementation of the currently disclosed improved padlock.

FIG. 17 provides a control-flow diagram for the internal control logic of the currently discussed implementation of the currently disclosed improved padlock. In step 1702, the currently disclosed improved padlock is initialized, which includes initializing in-memory stored information and communications logic. In step 1704, the motor is activated to position the cam to release the latch plate. When the switch is in the up position, as determined in step 1706, the current state of the improved padlock is set to locked, in step 1708. Otherwise, when the switch is in the horizontal position, the current state is set to ready/no-timer in step 1710. In step 1712, the secure padlock enters a sleep period. The sleep period is a significant feature of the currently disclosed improved padlock. By spending most of its time in sleep periods, the improved padlock minimizes the drain of energy from the internal batteries. A new-generation padlock that remains in continuous communication with a remote controller would need to be powered from an external energy source in order to have operational periods of sufficient duration for most uses. By careful conservation of energy dissipation, the currently disclosed improved padlock is able to operate for useful periods of time using only an internal-battery energy source. The sleep period can be interrupted in various ways. The sleep period can be interrupted by expiration of an internal timer, by a wake-up-event comprising a radio-frequency signal or another type of signal independent from the mesh network used by the improved padlock to communicate with the remote controller when the improved padlock is not sleeping, by a sync signal that is also communicated independently from the mesh network, by RFID detection of a nearby key card, and by a switch-state signal generated when the switch transitions from an upward position to a horizontal position or from a horizontal position to an upward position. Various different implementations may use different types of methods for generating wake-up events and sync signals. When a wake-up event interrupts a sleep period, as detected in step 1714, the microprocessor transitions to an awake state in which the microprocessor can call a wake-up-event handler, in step 1716, and in which the microprocessor can power on network-communications devices. Otherwise, when key-card proximity is sensed, in step 1718, a key-card handler is called, in step 1720. Otherwise, when expiration of the remote-controller timer occurs, as detected in step 1722, an rc-timer handler is called in step 1724. Otherwise, when a sync event is detected in step 1726, a sync handler is called in step 1728. Otherwise, when a switch-state change is detected, in step 1730, a switch handler is called in step 1732. Otherwise, when expiration of the open timer is detected, in step 1734, an open-timer handler is called in step 1736. Ellipsis 1738 indicates that additional types of sleep-period-interruption events may be detected and handled by the control logic of the improved padlock. A default handler 1740 handles any rare or unexpected types of events. Following handling of the sleep-period-interruption event, the control logic determines, in step 1742, whether there are any additional events that have been queued for handling. If not, control returns to step 1712, where the improved padlock enters a next sleep period. Otherwise, a next event is dequeued, in step 1744, and control returns to step 1714 for handling of the dequeued event.

Figure 18A:
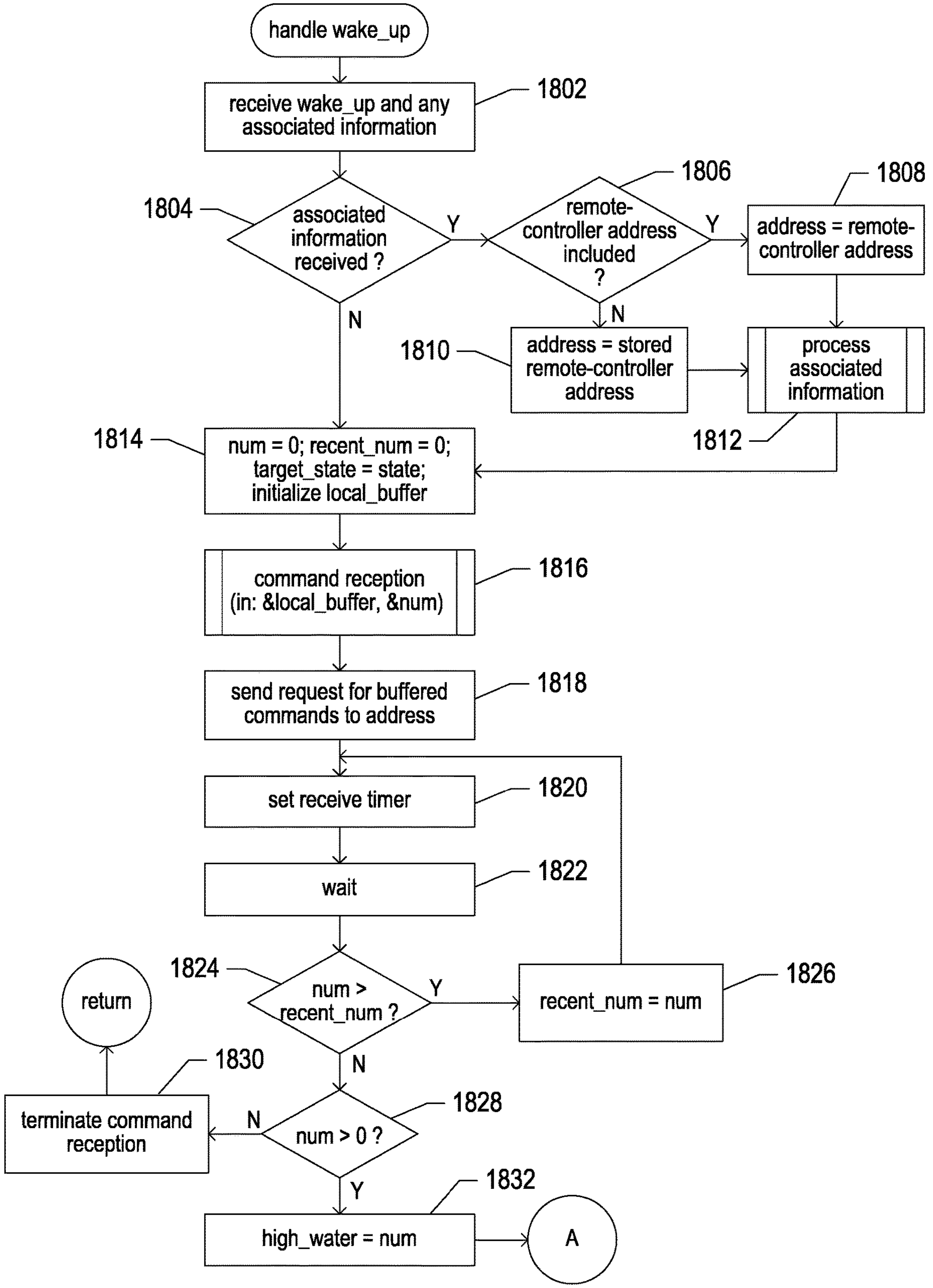
FIGS. 18A-B provide control-flow diagrams for the wake-up handler called in step 1716 of FIG. 17.
Figure 18B:
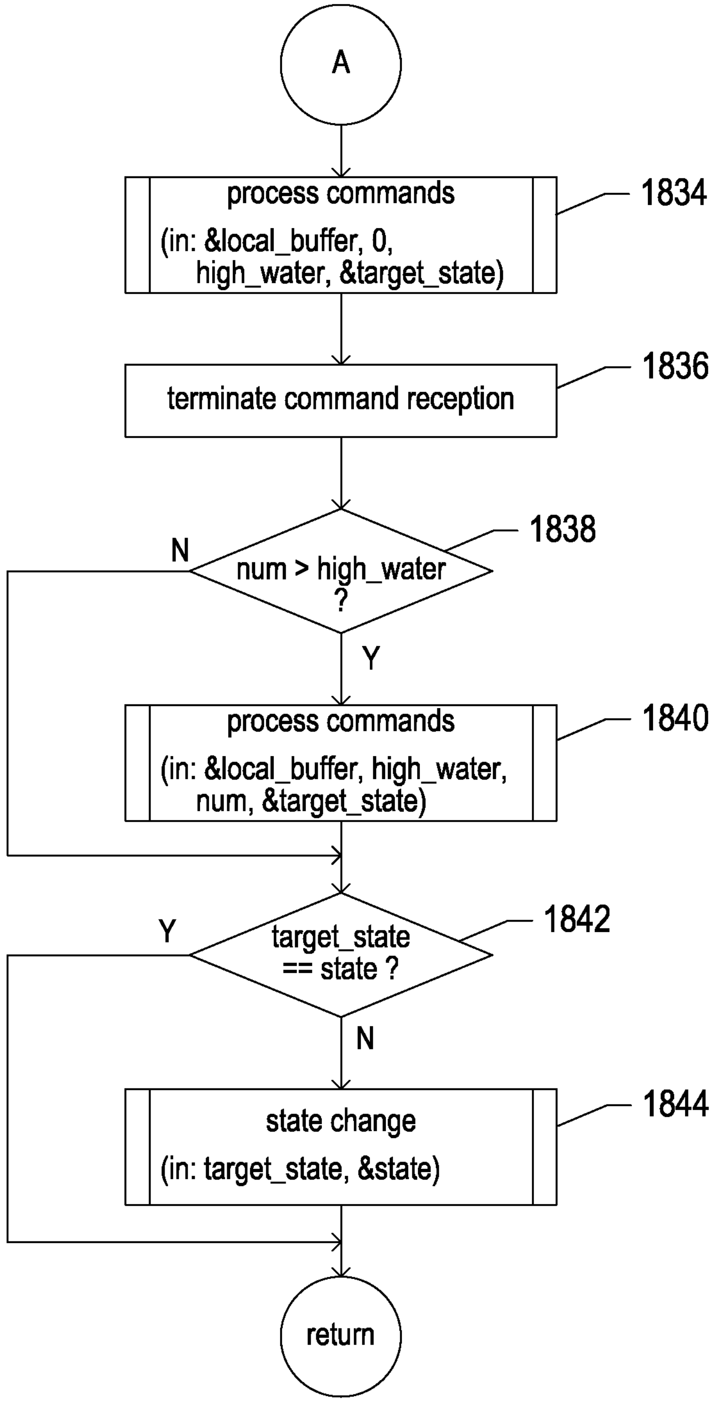

FIG. 18A-B provide control-flow diagrams for the wake-up handler called in step 1716 of FIG. 17. This routine implements asynchronous communications between the improved padlock and the remote controller. In step 1802, the wake-up handler receives the wake-up signal and any associated information provided by the signal. If the signal includes associated information, as determined in step 1804, and if a remote-controller address is included in the signal, as determined in step 1806, a local variable address is set to the address included in the signal in step 1808. Otherwise, the local variable address is initialized with a stored remote-controller address in step 1810. In both cases, the associated information is processed by a call to the routine "process associated information," in step 1812. Thus, in certain implementations, the wake-up signal or event can communicate information, such as a new address for the remote controller, to the improved padlock. In step 1814, local variables num and recent_num are both initialized to 0, local variable target_state is set to the current contents of the variable state, and a local memory buffer local_buffer is initialized. In step 1816, a routine "command reception" is called with a reference to local_buffer and to the variable num as arguments. The routine "command reception" executes asynchronously, activates network communications, and continues to receive commands from the remote controller, place the received commands in the local buffer, and increment the value stored in local variable num for each received command. In step 1818, the improved padlock sends a request for buffered commands to the network address stored in local variable address. In step 1820, the receive timer is set, using the stored receive_timer_interval value (1614 in FIG. 16) and, in step 1822, the wake-up handler weights for the receive timer to expire. When the value stored in local variable num is greater than the value stored in local variable recent_num, as determined in step 1824, the value stored in local variable num is stored in local variable recent_num, in step 1826, and control returns to step 1820. Thus, the loop of steps 1820, 1822, 1824, and 1826 iterates until the commands buffered by the remote controller for the improved padlock have been transmitted to the improved padlock and stored in the local buffer. When the value stored in local variable num is 0, as determined in step 1828, command reception is terminated, including deactivation of network-communications devices, in step 1830, and the wake-up handler returns. Otherwise, local variable high_water is set to the value stored in local variable num, in step 1832. Then, in step 1834 in FIG. 18B, the routine "process commands" is called to process all of the commands received from the remote controller and stored in the local buffer. In step 1836, command reception is terminated by terminating the asynchronous command-reception process launched in step 1816 and deactivating network-communications components. When the value stored in local variable num is greater than the value stored in local variable high_water, as determined in step 1838, additional commands were received from the remote controller during execution of the routine "process commands" in step 1834. In this case, the routine "process commands" is again called, in step 1840, to process the additional commands. The routine "process commands" updates local variable target_state to indicate the state to which the most recently received lock-state-change command from the remote controller directs the padlock to transition. When the target state is different from the current state of the improved padlock, as determined in step 1842, a routine "state change" is called, in step 1844, to effect the state change directed by the remote controller.

Figure 19:
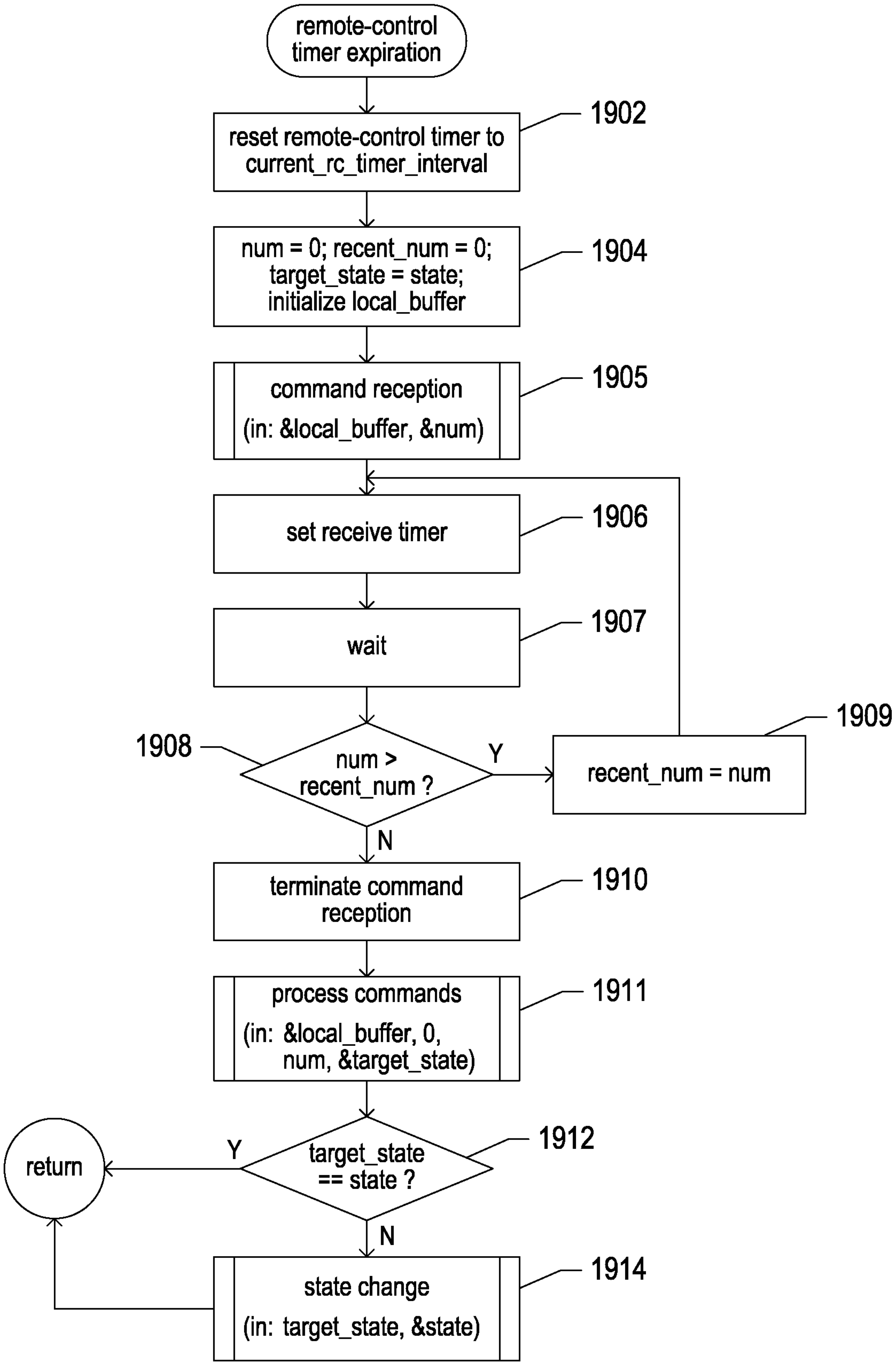
FIG. 19 provides a control-flow diagram for the rc-timer handler called in step 1724 of FIG. 17.

FIG. 19 provides a control-flow diagram for the re-timer handler called in step 1724 of FIG. 17. The remote-control timer, the re-timer handler, and the sync-handler routine discussed below together implement synchronous communications between the improved padlock and the remote controller. Many of the steps in this routine are identical to previously described steps in the wake-up-handler routine discussed above with reference to FIGS. 18A-B. These identical steps will not be again discussed at the level of detail they were discussed above. In step 1902, the rc-timer handler resets the remote-controller timer to the value stored in current_rc_timer_interval (1612 in FIG. 16). This may additionally involve decreasing the next remote-controller-timer expiration period to account for a delay in processing the current remote-controller-timer expiration, as discussed below for the sync-handler routine. Then, in steps 1904-1911, the rc-timer handler receives and processes commands from the remote controller, using similar steps previously discussed with reference to FIGS. 18A-B. When the value stored in local variable target_state is equal to the current state of the improved padlock, as determined in step 1912, the rc-timer handler returns. Otherwise, the rc-timer handler calls the routine "state change" in step 1914, to effect the state change directed by the remote controller before returning.

Figure 20:
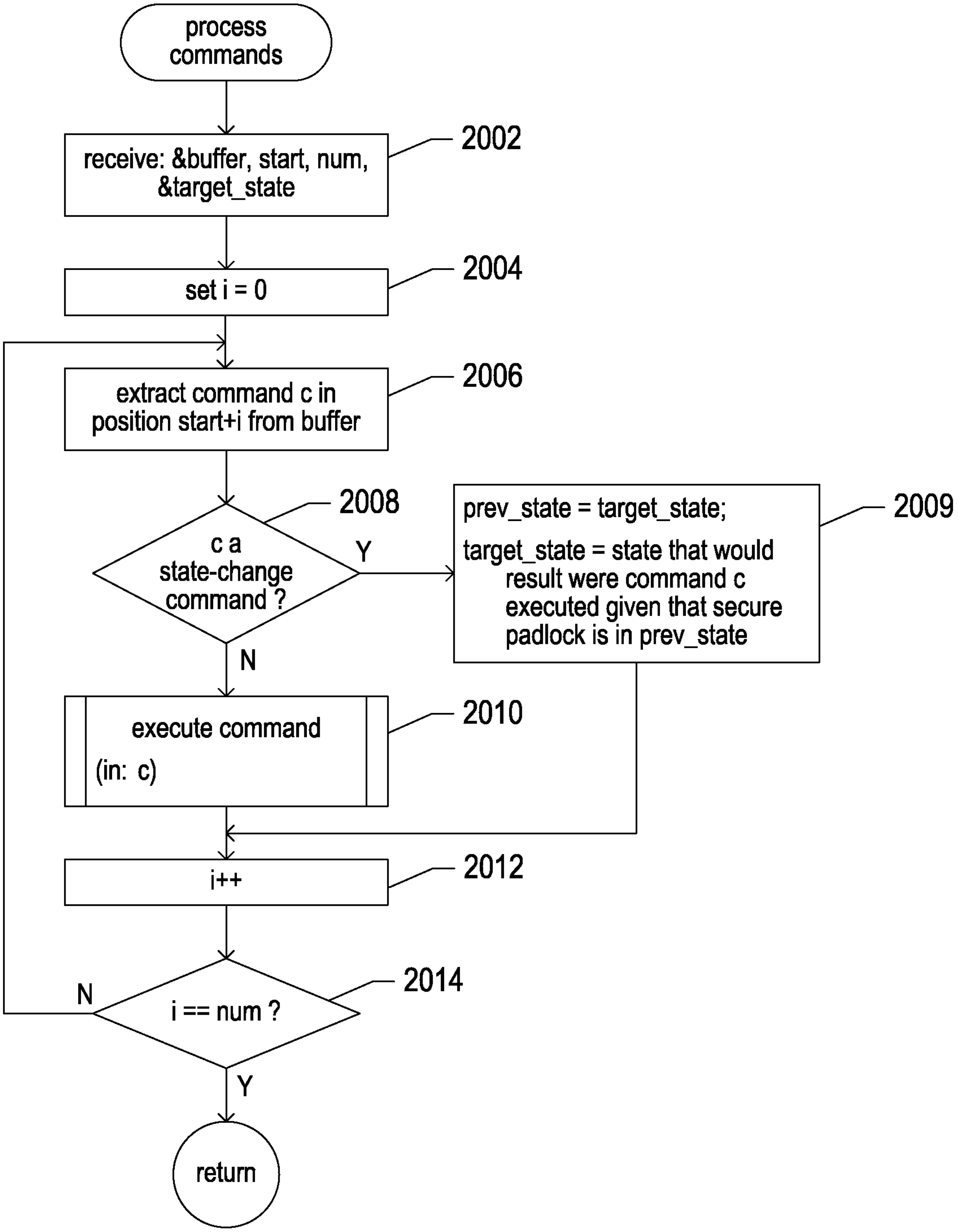
FIG. 20 provides a control-flow diagram for the routine "process commands," called in steps 1834 and 1840 of FIG. 18B and step 1911 of FIG. 19.

FIG. 20 provides a control-flow diagram for the routine "process commands," called in steps 1834 and 1840 of FIG. 18B and step 1911 of FIG. 19. In step 2002, the routine "process commands" receives a reference to a buffer that stores commands, an indication start of the position in the buffer to begin retrieving commands, an indication num of the number of commands to process, and a reference to a variable target_state. In step 2004, the routine "process commands" sets a local variable i to 0. In step 2006, a command c is extracted from the position start+i in the local buffer. When the command is a state-change command which directs the improved padlock to change its state, as determined in step 2008, a local variable prev_state is set to the current value of variable target_state and the variable target_state is set to an indication of the state that will result if the command is executed, given that the improved padlock is in the state indicated by the contents of local variable prev_state, in step 2009. Thus, state-change commands are not immediately executed. By contrast, commands other than state-change commands are executed, in step 2010. These may be commands that change the configuration of the improved padlock, such as changing the contents of one or more of the various stored information values discussed with reference to FIG. 16. Alternatively, these commands may request information from the improved padlock, such as the current state of the improved padlock. In step 2012, local variable i is incremented. When the value stored in local variable i is equal to the value provided by argument num, as determined in step 2014, control returns to step 2006 for processing of an additional buffered command. Otherwise, the routine "process commands" returns.

Figure 21A:
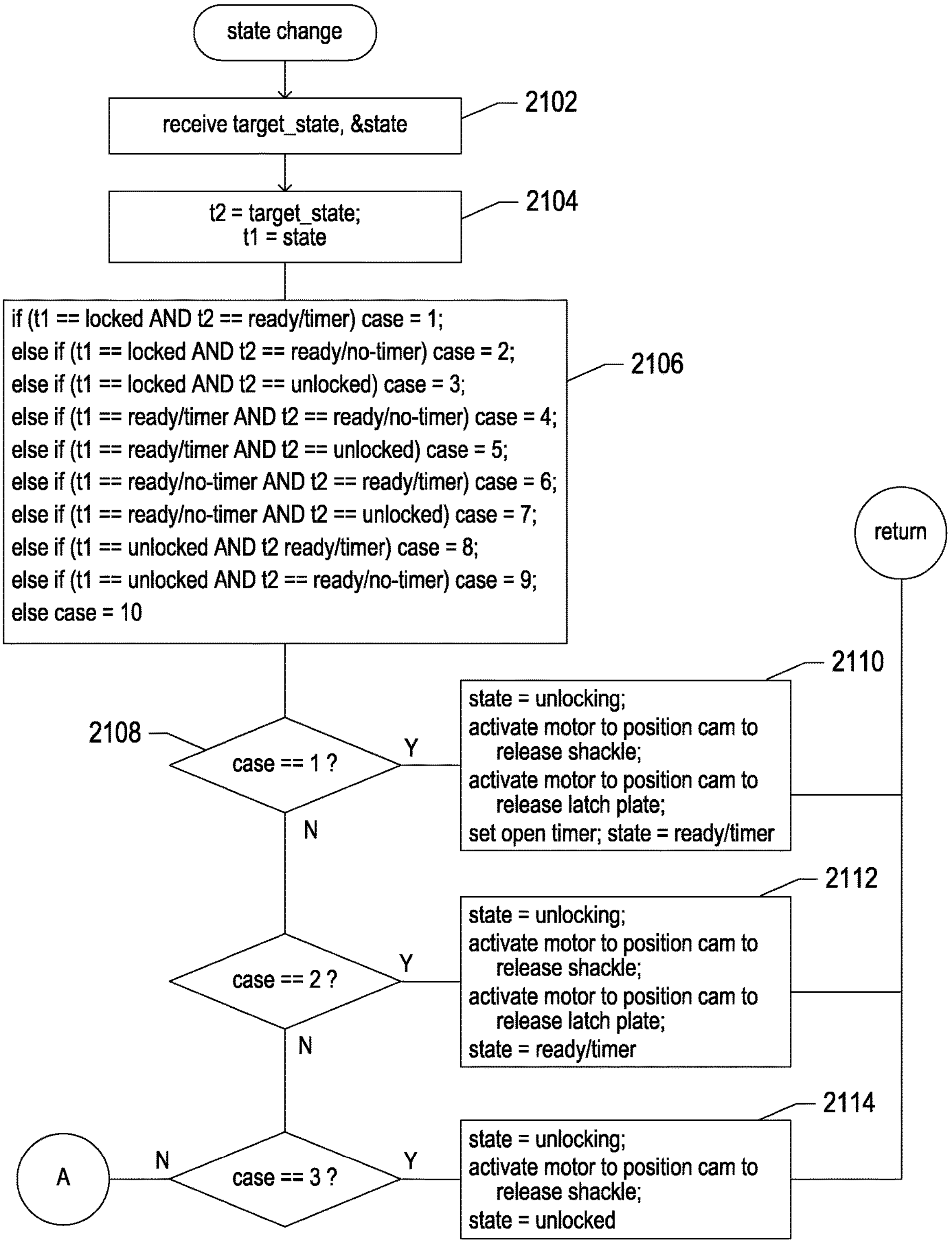
FIGS. 21A-B provide a control-flow diagram for the routine "state change," called in steps 1844 of FIG. 18B and 1914 of FIG. 19.
Figure 21B:
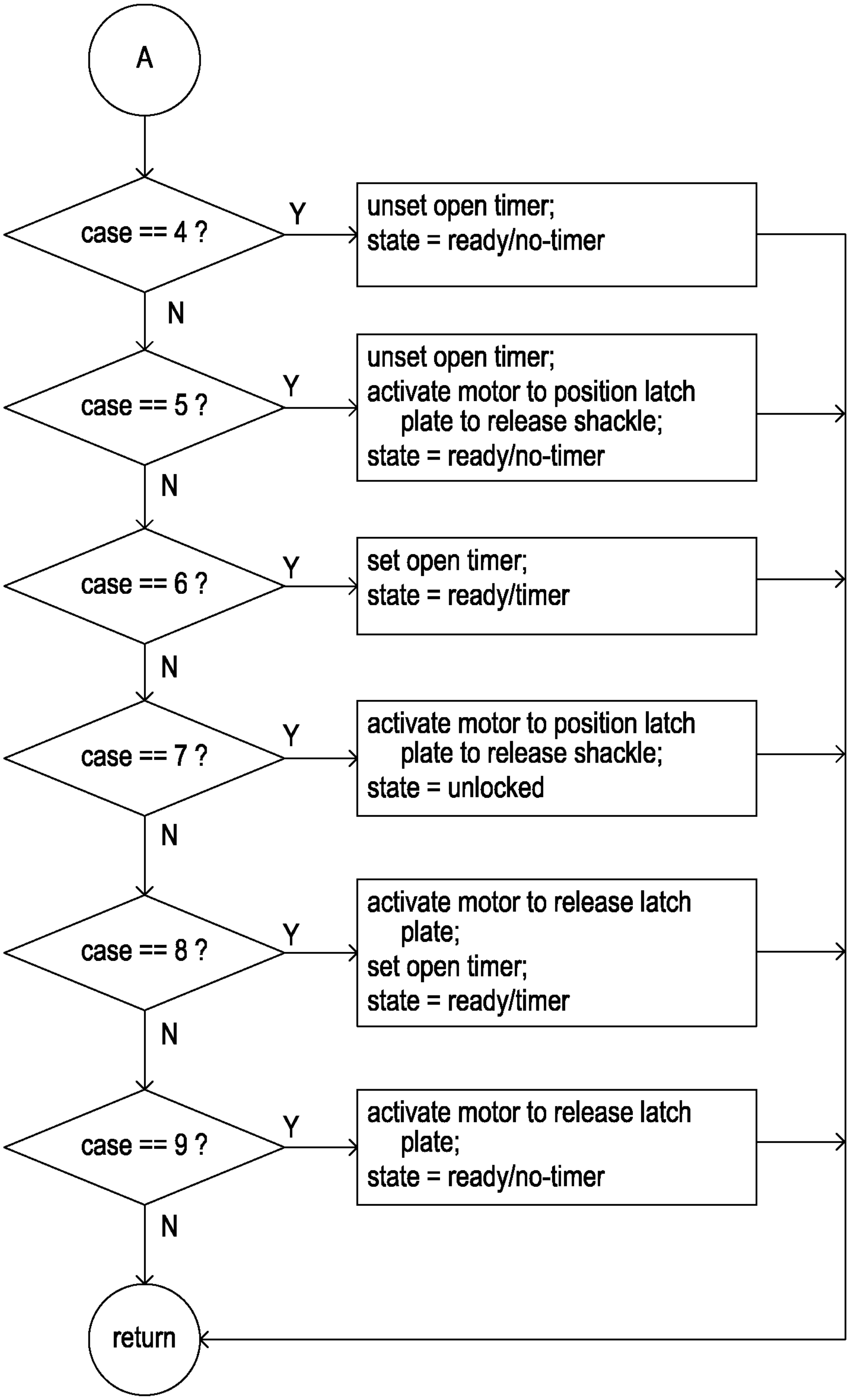

FIGS. 21A-B provide a control-flow diagram for the routine "state change." called in steps 1844 of FIG. 18B and 1914 of FIG. 19. In step 2102, the routine "state change" receives an indication of a target state and a reference to the state variable (1608 in FIG. 16). In step 2104, local variable t2 is sent to the target state and local variable t1 is set to the current state of the improved paddock. In step 2106, a large set of conditional expressions are used to determine a numerical value case for the target-state/state pair represented by the values of the received arguments. Then, in a series of conditional statements, the routine "state change" determines which one of the possible numerical case values represents the received arguments and carries out the actions needed to effect the state change to the target state given the current state of the improved padlock. For example, when the first case, case 1, represents the received arguments, as determined in step 2108, the target state is ready/timer (1516 in FIG. 15) and the current state is locked (1502 in FIG. 15). Therefore, transition 1504 is required. The transition is carried out by the steps included in step 2110. First, the current state is set to a temporary state unlocking. Then, the motor is activated to position the cam to translate the latch plate to a position that releases the shackle. The motor is then again activated to position the cam so that the latch plate will be released when the shackle is subsequently manually depressed. Then, the open timer is set to the time value stored in open_timer_interval (1610 in FIG. 16) and the improved-padlock state is set to ready/timer. Similar steps are included in step 2112 to effect a transition from the state locked to the state ready/no-timer. The steps included in step 2114 effect a transition from the state locked to the state unlocked. The different cases indicated by numerical values 1-9 represent the possible state transitions that can be effected by the improved padlock. Other state transitions are not possible and thus the routine "state change" simply returns rather than attempting to carry them out.

Figure 22:
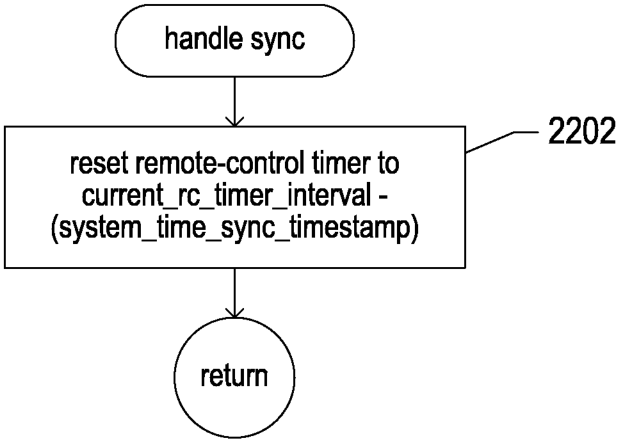
FIG. 22 provides a control-flow diagram for the sync handler called in step 1728 of FIG. 17

FIG. 22 provides a control-flow diagram for the sync handler called in step 1728 of FIG. 17. In step 2202, the remote-controller timer is reset to expire after the time interval equal to the value stored in current_rc_timer_interval (1612 in FIG. 16) minus whatever time has transpired since time stamping of the received sync signal. Sync signals are periodically sent by the remote controller to the improved padlock to ensure that the expiration of the remote-controller timer coincides with the time that the remote controller begins to transfer commands to the improved padlock.

Figure 23:
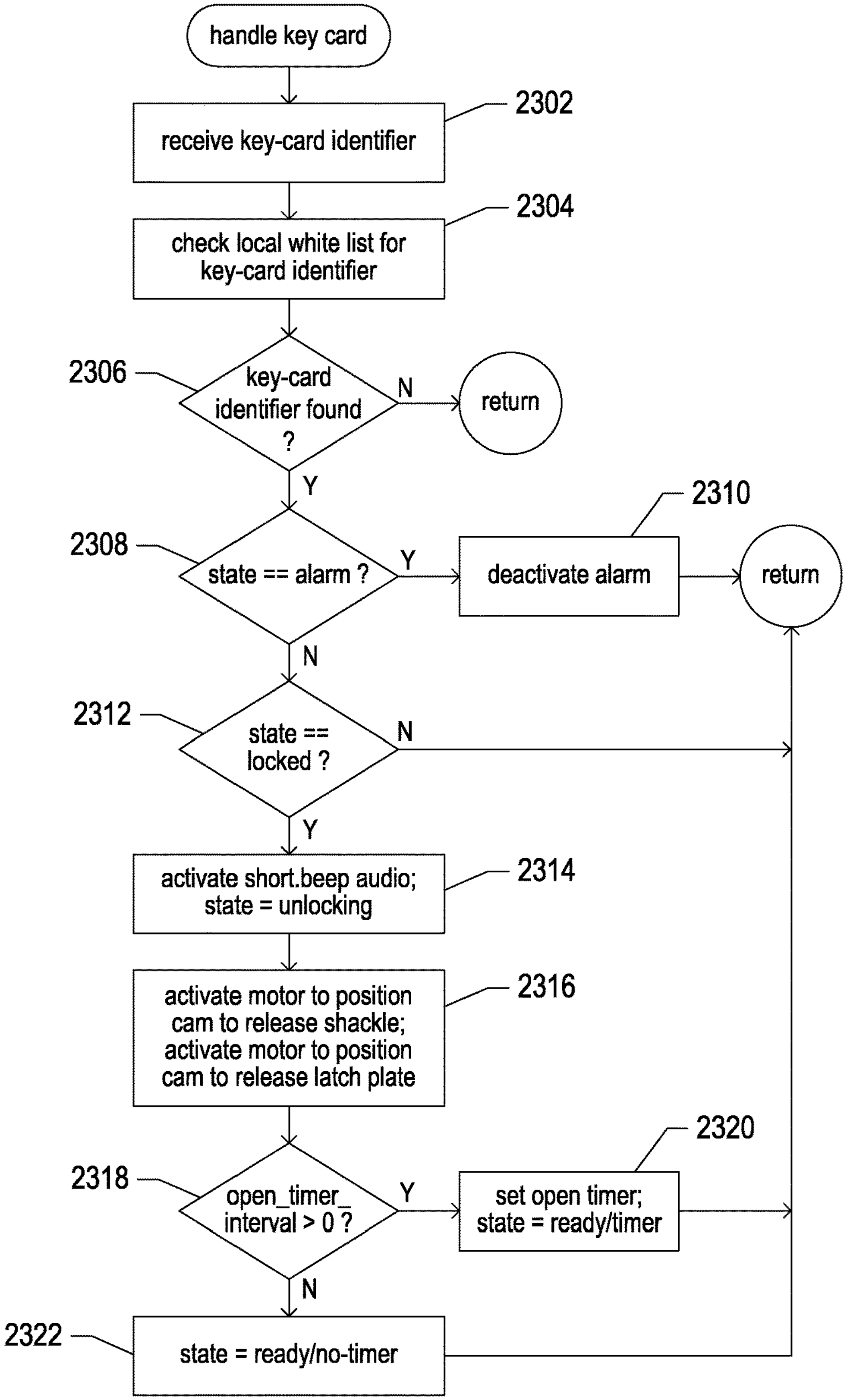
FIG. 23 provides a control-flow diagram for the key-card handler called in step 1720 of FIG. 17.

FIG. 23 provides a control-flow diagram for the key-card handler called in step 1720 of FIG. 17. In step 2302, the key-card handler receives the numeric identifier associated with the key card placed near the improved padlock. In step 2304, the key-card handler searches for the identifier stored in the authorization_list array (1616 in FIG. 16). If the key-current identifier is not found, as determined in step 2306, the routine "handle key card" returns. Otherwise, if the current state of the improved padlock is alarm, as determined in step 2308, the alarm is deactivated, in step 2310. Otherwise, when the current state of the improved padlock is locked, as determined in step 2312, the control logic activates a short beeping audio signal and sets the current state of the improved padlock to the temporary state unlocking, in step 2314. In step 2316, the control logic activates the motor to position the cam to release the shackle and then again activates the motor to position the cam to release the latch plate. When the value stored in open_timer_interval (1610 in FIG. 16) is greater than a 0, as determined in step 2318, the open timer is set to expire following a period of time indicated by the value stored in open_timer_interval and the state of the improved padlock is set to ready/timer, in step 2320. Otherwise, the state of the improved padlock is set to ready/no-timer in step 2322.

Figure 24:
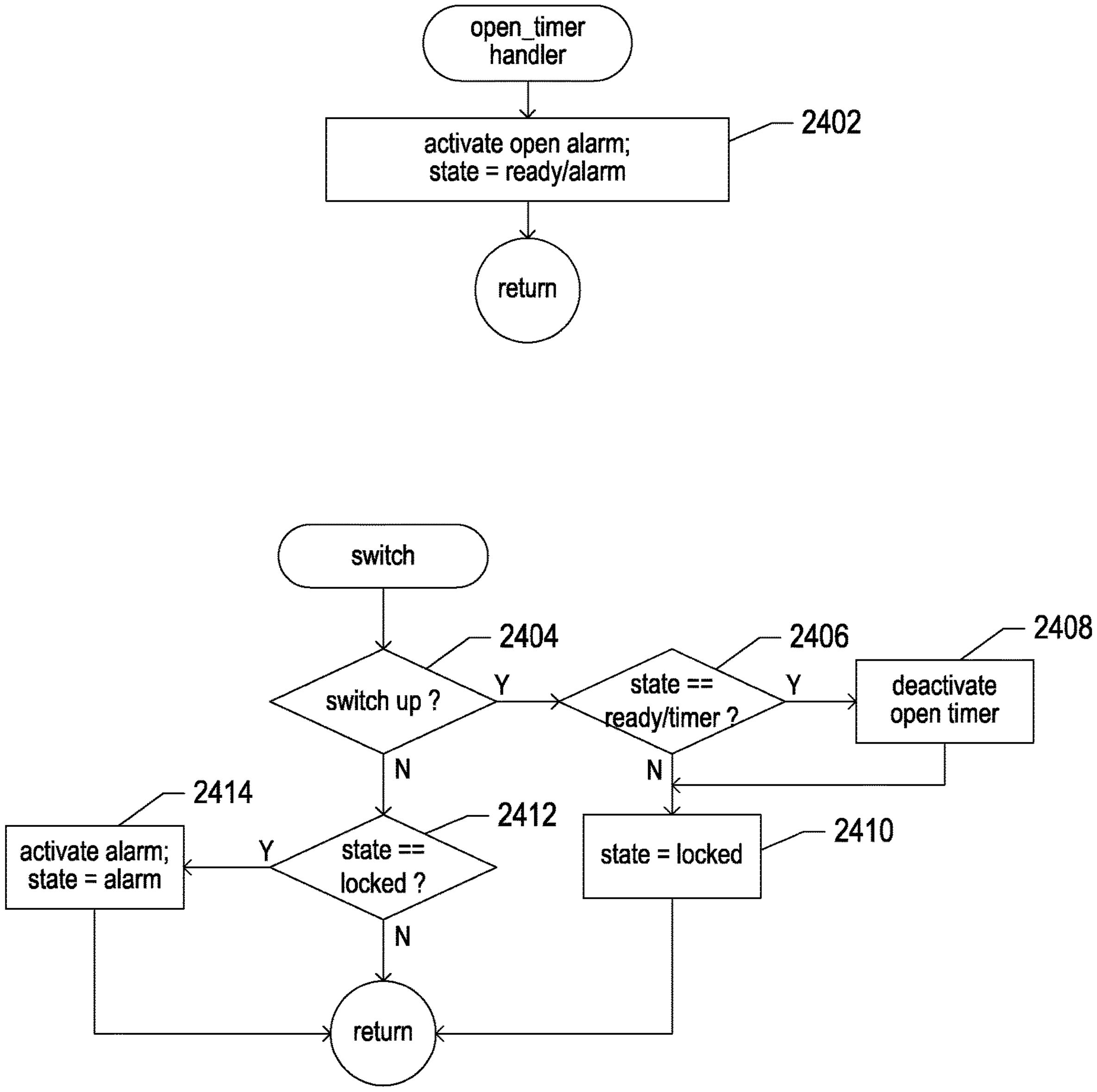
FIG. 24 provides control-flow diagrams for the open-timer handler called in step 1736 of FIG. 17 and for the switch handler called in step 1732 of FIG. 17.

FIG. 24 provides control-flow diagrams for the open-timer handler called in step 1736 of FIG. 17 and for the switch handler called in step 1732 of FIG. 17. In step 2402, the open-timer handler activates the alarm generated when the improved padlock has been open for more than the maximum allowed time and then sets the current state of the improved padlock to ready/alarm. The switch handler is called when a state change of the switch is detected. In step 2404, the switch handler determines whether the switch is currently in the up position. If so, the switch handler determines, in step 2406, whether the current state of the improved padlock is ready/timer. If so, the open timer is deactivated, in step 2408. In step 2410, the current state of the improved padlock is set to locked. When the current state of the switch is horizontal, as determined in step 2404, and when the current state of the switch is locked, as determined in step 2412, the alarm is activated, in step 2414, and the current state of the improved padlock is set to alarm.

There are many different possible implementations of the control logic for various different implementations of the currently disclosed improved padlock. For example, the change in the switch state may be used to control when to turn off the motor, rather than relying on positioning the cam to one or more positions in order to position the latch plate during various operations. Many additional features may be incorporated into the currently disclosed improved padlock which may be implemented with additional padlock control logic and padlock states.

Although the present invention has been described in terms of particular embodiments, it is not intended that the invention be limited to these embodiments. Modifications within the spirit of the invention will be apparent to those skilled in the art. For example, any of many different design and implementation parameters may be varied to produce alternative implementations of the currently disclosed methods and systems, including choice of operating system and virtualization, programming language, hardware platform, modular organization, control structures, data structures, and other such parameters. Of course, different implementations may reflect different components of the improved padlock, including different types of microprocessors.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An improved, remotely controlled, internally powered electronic padlock comprising:

a shackle with an engagement feature; and a housing within which the shackle is translationally and rotationally mounted, the housing including a switch that generates a signal when a state of the switch is changed, an electric motor with a motor shaft to which a translation device is mounted, a moveable member with an engagement feature complementary to the shackle engagement feature that is translated, by activation of the electric motor, in a first direction to release the shackle, placing the padlock in an unlocked state, and is translated in a second direction to lock the shackle by engaging the moveable-member engagement feature with the shackle engagement feature, placing the padlock in an unlocked state, the moveable member changing the state of the switch when the padlock is in a locked state and the shackle is mechanically compromised and rotated, network-communications functionality that receives commands from a remote controller and transmits responses to the remote controller, an internal electrical-energy source, and a microprocessor, powered by the internal energy source, that receives the signal generated by the switch when the padlock is in a locked state and the shackle is mechanically compromised and rotated and, in response to receiving the signal, activates an alarm, and periodically activates network-communications functionality to communicate with the remote controller.

2. The improved, remotely controlled, internally powered electronic padlock of claim 1 wherein the shackle is a cylindrical rod formed into a U shape, with a first shackle arm and a second shackle arm, the first shackle arm having a first engagement feature and the second shackle arm having a second engagement feature, the first engagement feature of the first shackle arm and the engagement feature of the second shackle arm together composing the shackle engagement feature.

3. The improved, remotely controlled, internally powered electronic padlock of claim 2 wherein the moveable member is a latch plate; and wherein the moveable-member engagement feature includes a first latch-plate engagement feature complementary to the first engagement feature of the first shackle arm, and a second latch-plate engagement feature complementary to the second engagement feature of the second shackle arm.

4. The improved, remotely controlled, internally powered electronic padlock of claim 3 wherein the first engagement feature of the first shackle arm is a notch in the first shackle arm and the second engagement feature of the second shackle arm is a notch in the second shackle arm.

5. The improved, remotely controlled, internally powered electronic padlock of claim 4 wherein the first latch-plate engagement feature complementary to the first engagement feature of the first shackle arm is an edge of a first shackle-accommodating aperture in the latch plate through which the first shackle arm extends, the edge of the first shackle-accommodating aperture entering the notch in the first shackle arm when the shackle is pushed into the housing to place the padlock in the locked state; and wherein the second latch-plate engagement feature complementary to the second engagement feature of the second shackle arm is an edge of a second shackle-accommodating aperture in the latch plate through which the second shackle arm extends, the edge of the second shackle-accommodating aperture entering the notch in the second shackle arm when the shackle is pushed into the housing to place the padlock in the locked state.

6. The improved, remotely controlled, internally powered electronic padlock of claim 3 further including a latch-plate spring that is compressed when the latch plate is translated in the first direction by activation of the electric motor, releasing the shackle and placing the padlock in the unlocked state, and which provides a force to translate the latch plate in the second direction when the electric motor is activated to release the latch plate, placing the padlock in a ready state, and when the shackle is subsequently pushed into the housing to a locked position in which the first latch-plate engagement feature engages the first engagement feature of the first shackle arm and the second latch-plate engagement feature engages the second engagement feature of the second shackle arm, placing the padlock in the locked state.

7. The improved, remotely controlled, internally powered electronic padlock of claim 6 wherein the translation device is a cam that extends through a cam aperture of the latch plate; and wherein when the padlock is in the ready state and the cam is in a lock rotational position, the cam is not engaged with the latch plate, when the padlock is in the locked state, the cam is in a lock rotational position and is engaged with an edge of the cam aperture, when the padlock is in the locked state and the electric motor is activated, the cam is rotated to an unlock rotational state, applying a force to the latch plate that translates the latch plate in the first direction, compresses the latch-plate spring, and disengages the first latch-plate engagement feature from the first engagement feature of the first shackle arm and the second latch-plate engagement feature from the second engagement feature of the second shackle arm, placing the padlock in the unlocked state, and when the padlock is in the unlocked state and the electric motor is activated, the cam is rotated to a lock rotational position, releasing the latch plate and placing the padlock in the ready state.

8. The improved, remotely controlled, internally powered electronic padlock of claim 1 further comprising:

a shackle spring that is compressed when the shackle is pushed into a locking position and that decompresses, when the padlock is placed in an unlocked state, to push the shackle into an unlocked position.

9. The improved, remotely controlled, internally powered electronic padlock of claim 1 wherein when the moveable member has been translated in the second direction to engage the moveable-member engagement feature with the shackle engagement feature, the moveable member does not overlie the switch and, therefore, the switch is in a first state and the padlock is in the locked state, when the moveable member has been translated in the first direction to release the shackle, the moveable member overlies the switch and, therefore, the switch is in a second state and the padlock is in the unlocked state, and when the padlock is in the unlocked state and the electric motor is activated, the moveable member is released, but is prevented from translating to engage the moveable- member engagement feature with the shackle engagement feature until the shackle is pushed toward the housing, and, therefore, the switch remains in the second state and the padlock is in a ready state.

10. The improved, remotely controlled, internally powered electronic padlock of claim 9 wherein, when the padlock in in the locked state, the shackle is cut, and one of the portions of the cut shackle is rotated, the moveable member is translated by the rotation of one of the portions of the cut shackle in the first direction, changing the position of the switch from the first state to the second state and causing the switch to generate a signal that is transmitted to the microprocessor, which, in turn, generates an alarm.

11. The improved, remotely controlled, internally powered electronic padlock of claim 1 wherein the microprocessor alternates from a sleeping state, during which network-controller functionality is powered off and therefore does not consumer energy from the internal electrical-energy source, and a networked state during which the network-controller functionality is powered on and the improved padlock receives commands from the remote controller and transmits responses to the received commands to the network controller.

12. The improved, remotely controlled, internally powered electronic padlock of claim 11 wherein the types of commands received from the remote controller include:

an open command, which directs the microprocessor to activate the electric motor in order to place the improved padlock in the unlocked state;

a lock command, which directs the microprocessor to activate the electric motor to release the moveable member and place the improved padlock in a ready state;

configuration commands that direct the microprocessor to store configuration information or update stored information; and one or more commands that request information from the improved padlock, including the current state of the improved padlock.

13. The improved, remotely controlled, internally powered electronic padlock of claim 11 wherein the improved padlock includes signal-receiving functionality in addition to the network-communications functionality;

the improved padlock receives a signal generated by the remote controller through the signal-receiving functionality; and in response to receiving the signal, the microprocessor transitions from the sleep to an awake state and activates the network-controller functionality to enter the networked state.

14. The improved, remotely controlled, internally powered electronic padlock of claim 9 further including:

an internal communications device that senses the presence of an external device containing a complementary communications device and that receives an identifier and/or other information from the external device.

15. The improved, remotely controlled, internally powered electronic padlock of claim 14 further including a stored authorization list that contains identifiers of external devices authorized to control the improved padlock.

16. The improved, remotely controlled, internally powered electronic padlock of claim 15 wherein, when the internal communications device senses the presence of an external device containing a communications device complementary to the internal communications device, the microprocessor transitions from a sleep state to an awake state, receives an identifier from the external device, searches for the identifier in the authorization list, and when the identifier is found in the authorization list and when the improved padlock is in the locked state, activates the electric motor to place the improved padlock in the unlocked state.

17. The improved, remotely controlled, internally powered electronic padlock of claim 14 wherein the internal communications device is one of:

an RFID device; and a Bluetooth device.

18. The improved, remotely controlled, internally powered electronic padlock of claim 9 wherein the improved padlock includes a stored state indication that is updated, by the microprocessor, to indicate the current state of the improved padlock.

19. The improved, remotely controlled, internally powered electronic padlock of claim 17 wherein, when the improved padlock is in the ready state and the shackle is pushed into the housing to engage the shackle engagement feature with the moveable- member engagement feature, the microprocessor receives a state-change signal from the switch and updates the stored state indication to indicate that the improved padlock is in the locked state.

20. The improved, remotely controlled, internally powered electronic padlock of claim 1 wherein the network-communications functionality includes a Wi-Fi transceiver or an IoT-mesh receiver that supports connection of the improved padlock to a mesh network.

* * * * *